(12) United States Patent
Sporer et al.

(10) Patent No.: US 7,948,557 B2
(45) Date of Patent: May 24, 2011

(54) APPARATUS AND METHOD FOR GENERATING A CONTROL SIGNAL FOR A FILM EVENT SYSTEM

(75) Inventors: Thomas Sporer, Fuerth (DE); Michael Beckinger, Erfurt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1565 days.

(21) Appl. No.: 11/241,797

(22) Filed: Sep. 29, 2005

(65) Prior Publication Data

US 2007/0016866 A1 Jan. 18, 2007

(30) Foreign Application Priority Data

Jun. 22, 2005 (DE) .......................... 10 2005 028 978

(51) Int. Cl.
*H04N 9/475* (2006.01)
*G06F 3/00* (2006.01)
(52) U.S. Cl. ......... 348/512; 348/516; 715/723; 725/116
(58) Field of Classification Search .................. 348/512, 348/516; 715/723; 725/116
See application file for complete search history.

(56) References Cited

U.S. PATENT DOCUMENTS

| | | | |
|---|---|---|---|
| 4,839,733 A | 6/1989 | Karamon et al. | |
| 5,040,081 A | 8/1991 | McCutchen | |
| 5,055,939 A | 10/1991 | Karamon et al. | |
| 5,087,980 A * | 2/1992 | Staffer | 386/205 |
| 5,218,486 A | 6/1993 | Wilkinson | |
| 5,790,236 A | 8/1998 | Hershtik et al. | |
| 2004/0073916 A1 | 4/2004 | Petrovic et al. | |
| 2004/0128512 A1 | 7/2004 | Sharma et al. | |
| 2005/0022252 A1 | 1/2005 | Shen | |

FOREIGN PATENT DOCUMENTS

| | | |
|---|---|---|
| DE | 68918 270 | 2/1995 |
| DE | 103 22 722 A1 | 12/2004 |
| EP | 0 693 215 B1 | 6/1994 |
| EP | 0838960 A | 4/1998 |
| EP | 0869443 | 10/1998 |
| EP | 1519363 A | 3/2005 |
| JP | 02029963 | 1/1990 |
| JP | H09-062298 | 3/1997 |
| JP | H10-020420 | 1/1998 |
| JP | 2002-290921 | 10/2002 |

(Continued)

OTHER PUBLICATIONS

John J. Karamon; Synchronization of Digital Audio Channels to Analog Soundtrack; San Francisco; Oct. 1992.

(Continued)

*Primary Examiner* — Houshang Safaipour
(74) *Attorney, Agent, or Firm* — Michael A. Glenn; Glenn Patent Group

(57) ABSTRACT

An apparatus for generating a control signal for a film event system is described for synchronizing film events with an image reproduction, wherein a film comprises film information applied in a time sequence, and the apparatus comprises a means for storing the film information, wherein a time scale is associated to the stored film information, a means for receiving a section read from the film, a means for comparing the read section to the stored film information and a means for determining the control signal based on the comparison and the time scale.

25 Claims, 15 Drawing Sheets

FOREIGN PATENT DOCUMENTS

| WO | 94/16442 | 7/1994 |
|---|---|---|
| WO | 01/56277 A | 8/2001 |
| WO | 03/009273 | 1/2003 |

OTHER PUBLICATIONS

Kunio Kashino, Takayuki Kurozumi, and Hiroshi Murase; A Quick Search Method for Audio and Video Signals Based on Histogram Pruning; Ieee Transactions on Multimedia, vol. 5, No. 3; Sep. 2003.

Junsong Yuan, Qi Tian, and Surendra Ranganath; Fast and Robust Search Method for Short Video Clips from Large Video Collection; Inst. for Infocomm Research, Singapore ICPR'04.

Jordan, Dr. Frank et al., "Generating Time Code Information from Analog Sources", *Audio Engineering Society Convention Paper 6473*, presented at the 118$^{th}$ Convention, May 28-31, 2005, Barcelona, Spain, XP009070534.

Office Action mailed Jan. 5, 2011 in related Japanese Patent Application No. 2008-517365, 3 pages.

* cited by examiner

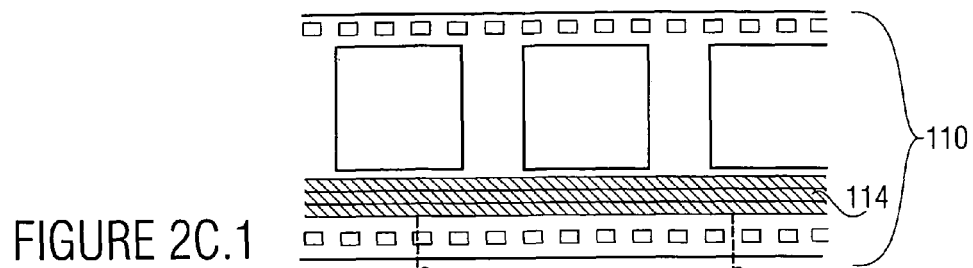
FIGURE 2C.1
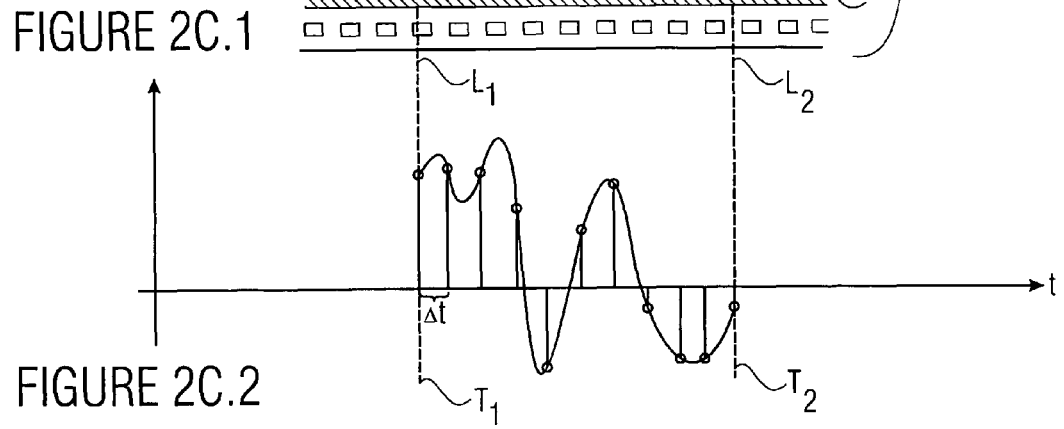
FIGURE 2C.2
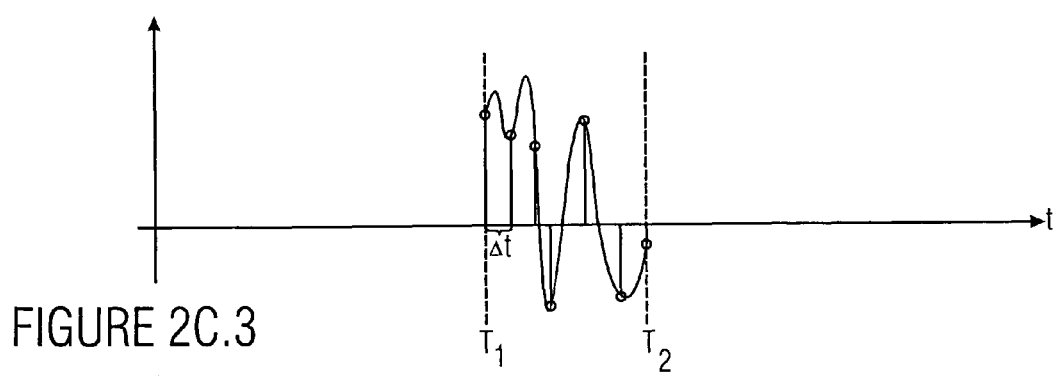
FIGURE 2C.3
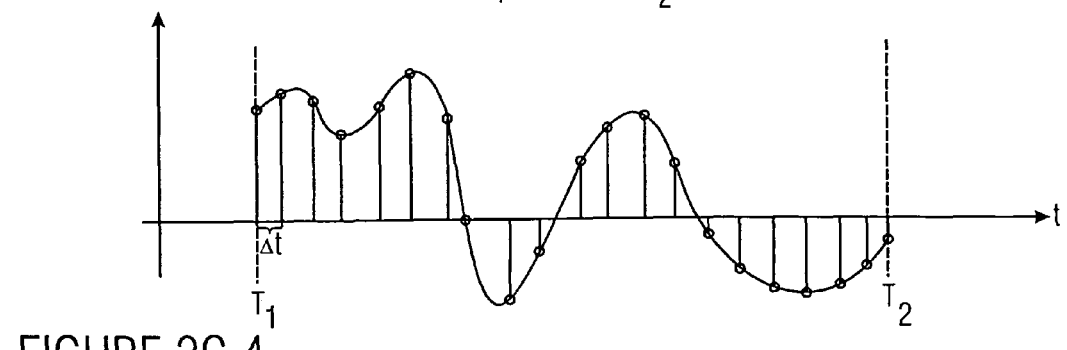
FIGURE 2C.4

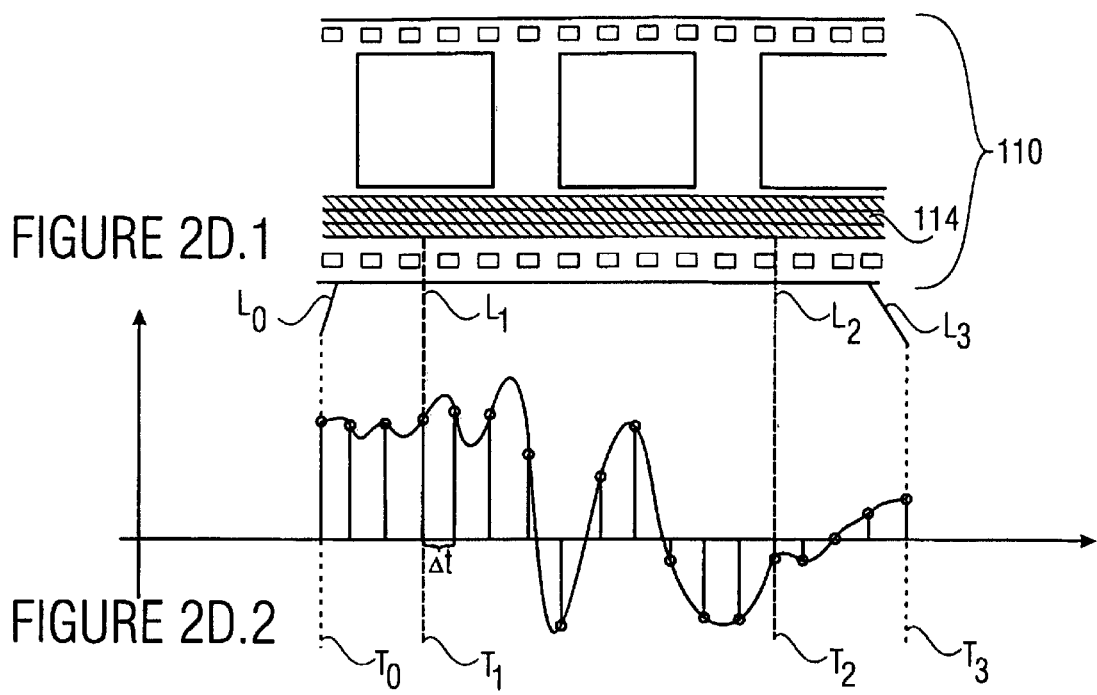
FIGURE 2D.1
FIGURE 2D.2
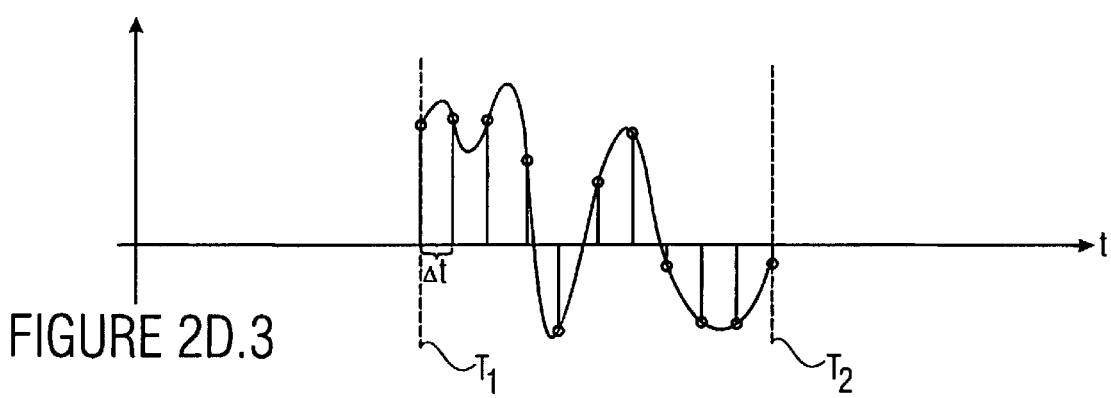
FIGURE 2D.3
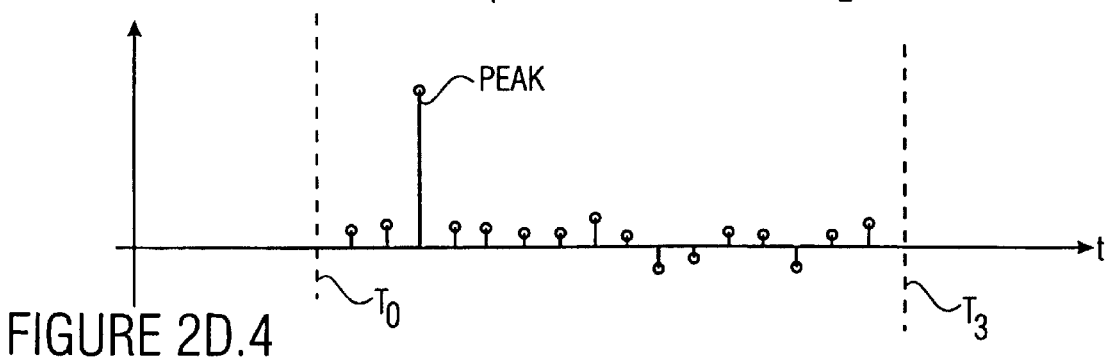
FIGURE 2D.4

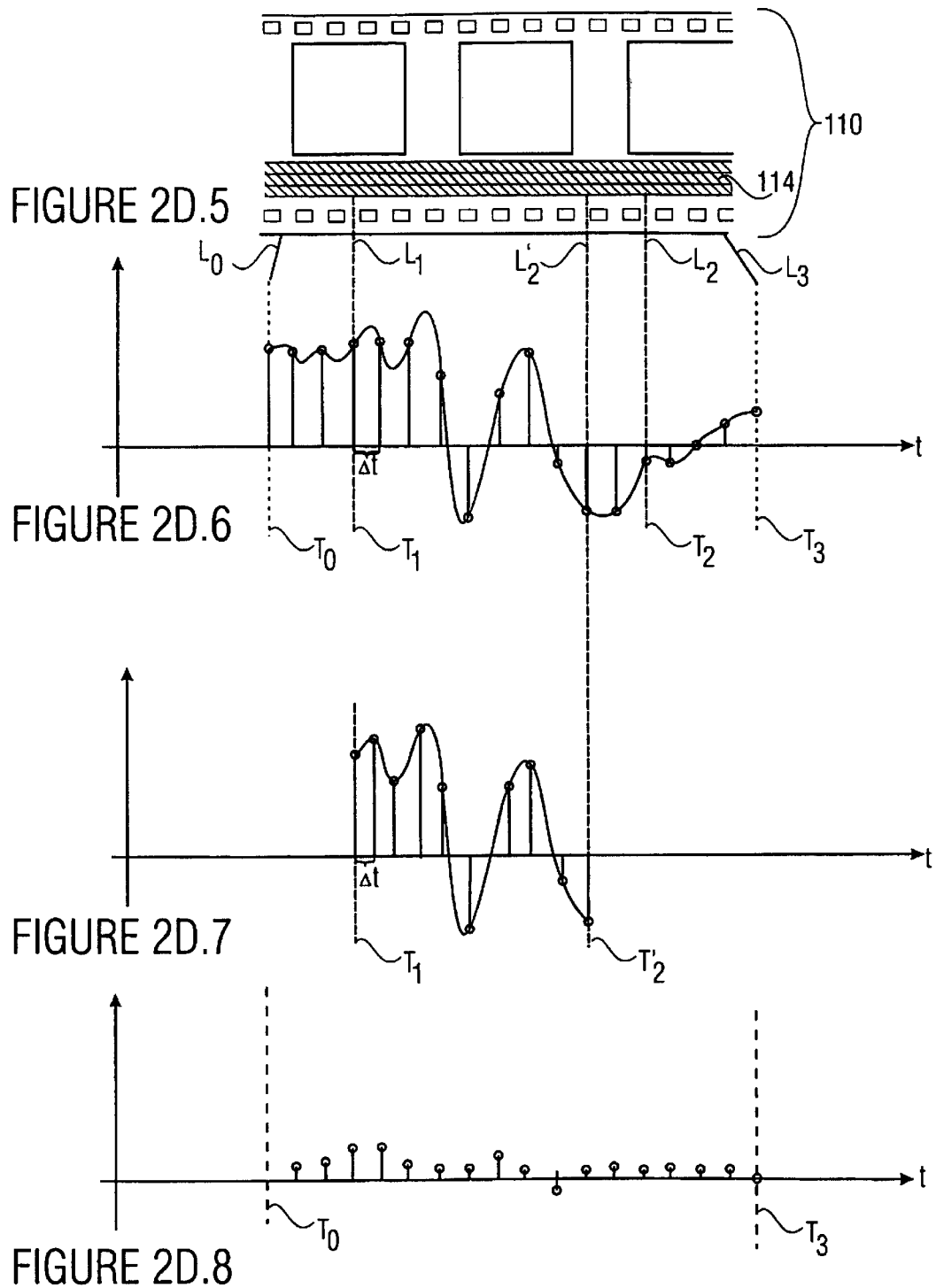

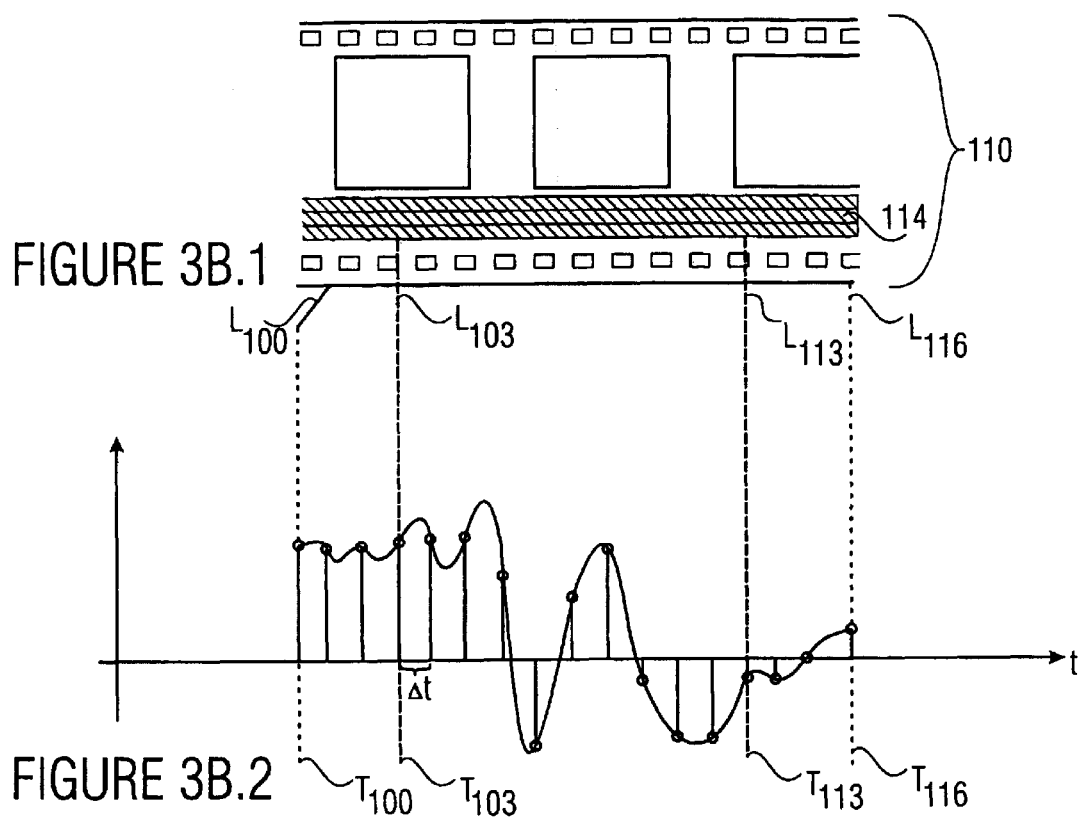

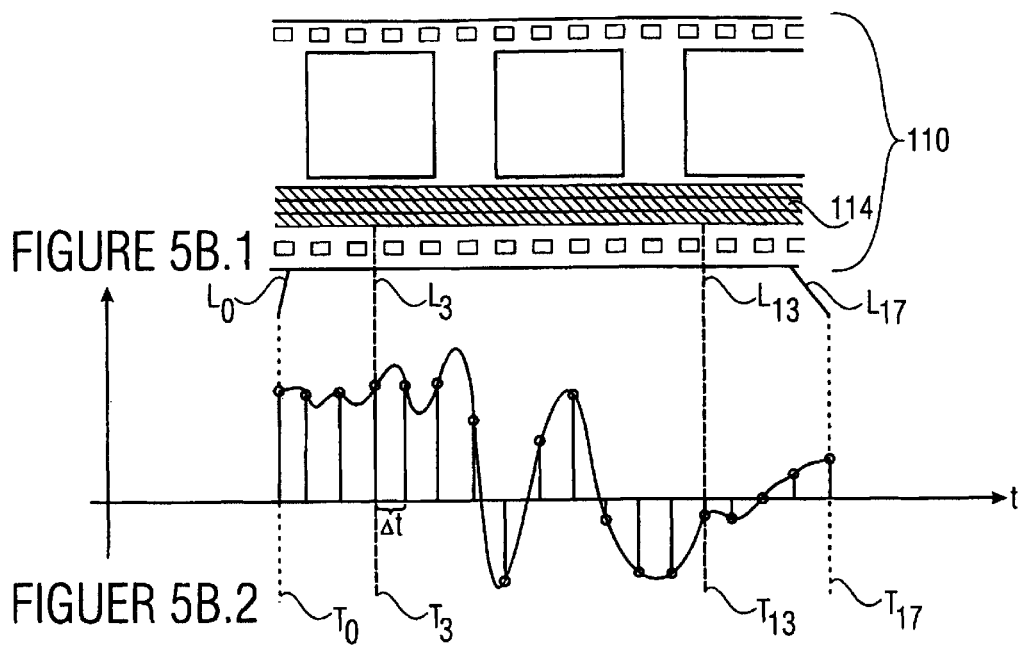
FIGURE 5B.1
FIGUER 5B.2
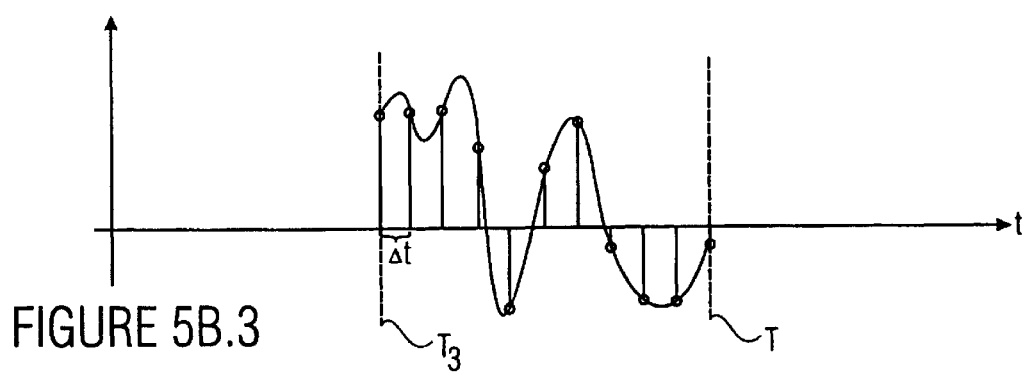
FIGURE 5B.3
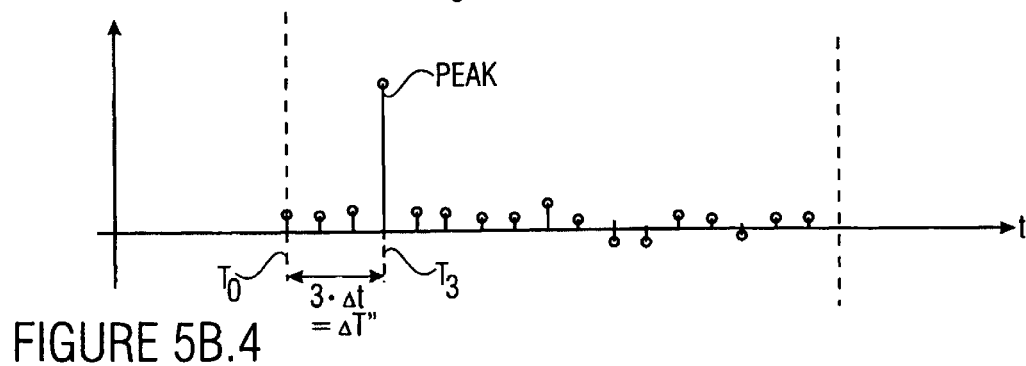
FIGURE 5B.4

APPARATUS AND METHOD FOR GENERATING A CONTROL SIGNAL FOR A FILM EVENT SYSTEM

CROSS-REFERENCE TO RELATED APPLICATION

This application claims priority from German Patent Application No. 102005028978.9, which was filed on Jun. 22, 2005 and is incorporated herein by reference in its entirety.

BACKGROUND OF THE INVENTION

1. Field of the Invention

The present invention relates to an apparatus and a method for generating a control signal for a film event system, to synchronize, for example, film events with image reproduction.

2. Description of the Related Art

Audio video data are stored on data carriers, i.e. film or tape, or transmission channels, i.e. radio or telephone, in a fixed format, which does not allow an extension by novel audio formats or other synchronous or image synchronous, respectively, supplementary services, such as subtitles. Thus, with the introduction of, for example, new audio formats thus, new data carriers or film copies, respectively, have to be produced, which have the new audio formats.

FIG. 8 shows an exemplary film 110. Film information, such as video information or images 112, respectively, which are also referred to as "frames" or "video frames", and audio information or a plurality of analog or digital soundtracks 114, which have "audio frames" in the digital case is applied in spatial sequence or, during replay, in time sequence, respectively. Further, the film 110 has, for example, advance perforations 116, with the help of which the film is played.

Basically, two methods are known for synchronizing supplements.

The first method comprises storing a time code on the data carrier, such as with DTS (digital theatre system) for cinema sound or in an additional channel connected to the audio signal. Examples herefore are ancillary data by DAB and mp3. The time code is used to replay sound or additional information, respectively, synchronously from an external data carrier, for example CD with DTS. However, it is a disadvantage of this method that every additional format requires further space on the data carrier or transmission channel, respectively, which might not be available. With film, these are for example the tracks for analog sound, Dolby digital, DTS, SDDS (sony dynamic digital sound). However, proprietary formats avoid the utilization of the time code of one extension by other extensions. Mutual interferences of the extensions cannot always be avoided, one example is the usage of ancillary data in MP3 for additional information and bandwidth extension from different manufacturers.

The second method is based on the improper use of analog soundtracks for storing time code, such as it is used for example in a prototype cinema equipped with an IOSONO system. However, it is a disadvantage of this method that the analog track exists in all systems and is often used as fallback solution during interferences of the other systems, which means a misuse of the analog track prevents the fallback possibility. Automatic switching to the analog track, which is installed in most cinemas, leads to the fact that the time code is replayed as analog signal when no signal is present on the "modern" tracks for Dolby digital or DTS, respectively. Thus, in the prototype cinema, during a pure wave-field synthesis reproduction, which will be discussed below, the redundant analog reproduction has to be switched off manually, because otherwise the time code can be heard via the redundant further loudspeakers.

The acoustic wave-field synthesis, short WFS goes beyond the surround approaches of the formats Dolby, SDDS or DTS. In WFS, an attempt is made to reproduce the air vibrations of a real situation, which constitute sound, across a whole room. In contrary to conventional reproduction across two or more loudspeakers, where the mapping of the position of the original sound source is limited to a line between the loudspeakers, the wave-field synthesis is to transmit the whole sound field true to the original to the room. This means that the virtual sound sources can be exactly spatially localized, and even seem to exist within the room, and thus can be encircled. Systems with up to 200 loudspeakers in cinema systems and up to 900 loudspeakers in theater sound systems have already been realized.

Wave-field synthesis is based on the Huygens' principle, which says that every point on a wave front can be seen as starting point for an elementary spherical wave. By interference of all elementary waves, a new wave front occurs, which is identical to the original wave.

Such a sound system has been developed by Fraunhofer Institute for Digital Media Technology under the name IOSONO and is used in cinema of Ilmenau.

Thus, the cinema of Ilmenau is mentioned as a practical example, where the wave-field synthesis is operated in two modes.

In the first mode, the cinema is operated as "real" wave-field synthesis system, wherein the time code is stored on the analog track of the 35 mm film, such as has been discussed above with regard to the second "improper" method, where the WFS sound is played from an external medium, such as hard disk or DVD.

In the second mode, "compatible reproduction", the sound stored in every 35 mm film is read out and decoded by a Dolby processor, alternatively, DTS or SDDS, respectively, could be used, wherein the Dolby processor, if necessary, switches automatically to the analog track and maps the occurring multi-channel signal via WFS to virtual loudspeakers.

Since different signal paths are required for both modes, a division of the signal coming from the read head for the analog signal is required, which causes additional technological effort.

Thus, in summary, it can be said that there is no room on current spools of cinema film to attach a further synchronization track, such as for external sound systems or subtitle systems. All cinema sound systems available up to now, analog and digital, obtain their soundtrack either directly via one or a plurality of soundtracks on the spool of film or by a manufacturer-specific time code signal on the spool of film. This means that for both known approaches, as explained above, new copies of the films have to be produced, usually with significant costs. Yet, audio formats like Dolby digital and SDDS allow modern audio experiences, but have still no time code for the synchronization of, for example, subtitles or foreign-language versions of the film sound recording.

SUMMARY OF THE INVENTION

It is an object of the present invention to provide an efficient concept for synchronizing, for example, audio signals or other events with a film without modifying the film itself.

In accordance with a first aspect, the invention provides an apparatus for generating a control signal for a film event system to synchronize a film event with an image reproduction, wherein a film has film information applied in a time sequence, having: a means for storing the film information, wherein a time scale is associated to the stored film information, a means for receiving a section read from the film, a means for comparing the read section with the stored film information and a means for determining the control signal based on the comparison and the time scale.

In accordance with a second aspect, the invention provides a method of generating a control signal for a film event system to synchronize a film event with an image reproduction, wherein a film comprises film information applied in a time sequence, having the steps of: receiving a section read from the film, comparing the read section with stored film information, wherein a time scale is associated to the stored film information and determining the control signal based on the comparison and the time scale.

In accordance with a third aspect, the present invention provides a computer program with a computer program code for performing the above-mentioned method when the computer program runs on a computer.

The present invention is based on the knowledge that every part of a film generally has film information specific for this part, which allow to determine the part in the film, to which the reproduced film information is associated or corresponds, by a comparison of a stored version of the film information to which a time scale is associated, and film information replayed by the film projector, for example via correlation. This knowledge allows an apparatus and a method for controlling a cinema event system, for example such that during a film projection, in dependence on a current part of this film, a different audio signal or subtitle can be replayed.

Thus, according to the invention, an apparatus and a method for generating a control signal for a film event system are provided to synchronize film events with an image reproduction, wherein a film comprises film information applied in a time sequence, comprising: a means for storing the film information, wherein a time scale is associated to the stored film information, a means for receiving a section read from the film, a means for comparing the read section with the stored film information and means for determining the control signal based on the comparison and the time scale.

In the method and/or the apparatus, the actual "old" data format or the format of the film information, respectively, on the "old" data carrier, the film, is not altered. Preferably, a compressed version of the "old" audio-visual signal is stored on the "new" data carrier of the "new" audio format or the additional services, respectively. By comparing the replayed audio-visual signal of the "old" data carrier and the version stored on the "new" data carrier, the exact time during the reproduction can be calculated. The comparison can be made via crosscorrelation, via calculating the difference as well as by calculating a compressed hash sum and searching the same in a database. The comparison can be limited to the audio signal, here, the little effort would be advantageous, however, a disadvantage would be the problems in quiet sequences or the problems with self-similar audio signals, the same can be limited to the video signal, here, it would be advantageous that still images are rare, but the high effort is disadvantageous and it is also disadvantageous that this works not at the beginning of films when the image is still dark, and the same can be based on both audio and video signal.

The significant advantage of this concept is that any sound system or film event system can be synchronized with a "normal" or unaltered cinema film. Apart from the above-mentioned audio event, examples for film events are, for example, subtitles and special effects, wherein special effects can comprise, for example airflow, shaking the cinema chairs, smells or light effects on side and back walls. Here, with regard to the audio result, both different languages, such as simultaneous playing of the original version and translations into other languages as well as different audio techniques are possible, such as synchronization of digital surround systems like the wave-field synthesis.

It is a further advantage of the concept that the existing projectors and demonstration apparatuses can still be used, in contrary to the prior art, and only have to be supplemented. Further, a preferred embodiment of the apparatus can be formed such that future formats of memory signals or time codes, respectively, can be integrated easily.

By threading the cinema film and the additional sound carrier and data set for the synchronization device, the projectionist has a slight overhead compared to a film system integrating all information including the "new" audio information or synchronization information on the film. But, as has already been discussed above, there is no more room for a further sound format on the currently available cinema films. Thus, this problem will occur with every introduction of a new sound format. In the currently available DTS cinema sound format, the separation of image carrier and sound carrier is already common practice.

Cinema films without time codes, both with a digital and analog sound can thus be enriched with additional film events in an economical way.

The apparatus for generating a control signal is suited for all applications where a sound format has to be synchronized to arbitrary events via a single-channel or multi-channel sound signal.

If the synchronization is, for example, only based on the audio signal, the cinema film remains unchanged and only a digitized or digital image of the sound signal or the soundtrack, respectively, or the plurality of soundtracks is stored in the respective time scale, wherein the digital audio signal can further be compressed to optimize memory space.

In the following, only the term digital image is used, regardless whether the original sound is analog, i.e. the image is digitized or digital, in order to keep the text clearer.

Even when the above-described and following examples talk of a cinemagoer or a film, the invention is not limited to cinema films for cinemagoers, but also relates generally to films or audio-visual signals, respectively, regardless whether these are film information stored on films or other data carriers and memory media, such as magnetic bands or hard drives. Additionally, the invention can also be used for pure sound systems without video, or for example, it can be used for the synchronization of pure video material, i.e. without sound, via video-ID, with arbitrary events.

BRIEF DESCRIPTION OF THE DRAWINGS

These and other objects and features of the present invention will become clear from the following description taken in conjunction with the accompanying drawings, in which:

FIG. 2c.1 is an exemplary section of a film;

FIG. 2c.2 is an exemplary curve of a sound signal of the section of the film illustrated in FIG. 2.c.1 with a variable first replay speed and a constant test sample rate;

FIG. 2c.3 is an exemplary curve of a sound signal of the section of the film illustrated in FIG. 2.c.1 in a variable second replay speed and a constant test sample rate;

FIG. 2c.4 is an exemplary curve of a sound signal of the section of the film illustrated in FIG. 2.c.1 with a variable third replay speed and a constant test sample rate;

FIG. 2d.1 is two exemplary sections of a film;

FIG. 2d.2 is an exemplary curve of a reference sound signal of the film;

FIG. 2d.3 is an exemplary curve of a test sound signal based on a first replay speed and a constant test sample rate for a section of the film;

FIG. 2d.4 is an exemplary first correlation result from the correlation of the reference sound signal according to FIG. 2d.2 and the test sound signal according to FIG. 2d.3;

FIG. 2d.5 is two exemplary sections of a film according to FIG. 2d.1;

FIG. 2d.6 is an exemplary curve of a reference sound signal of the film according to FIG. 2d.2;

FIG. 2d.7 is an exemplary curve of the test sound signal based on a second replay speed and a constant test sample rate for a section of the film;

FIG. 2d.8 is an exemplary second correlation result from the correlation of the reference sound signal according to FIG. 2d.6 and the test sound signal according to FIG. 2d.7;

FIG. 3b.1 is two sections of a film;

FIG. 3b.2 is an exemplary curve of the reference sound signal for the two sections according to FIG. 3b.1;

FIG. 5b.1 is two sections of a film;

FIG. 5b.2 is an exemplary curve of a reference sound signal for a first section of the film;

FIG. 5b.3 is an exemplary curve of a test sound signal for a second section of the film;

FIG. 5b.4 is an exemplary correlation result from the correlation of the reference sound signal according to FIG. 5b.2 and the test sound signal according to FIG. 5b.3;

DESCRIPTION OF THE PREFERRED EMBODIMENTS

In the following description of the invention or the preferred embodiments, respectively, the same reference numbers are used for similar or equal elements.

In the following, the invention will be discussed in more detail with regard to embodiments which use the sound signal applied to the film as film information. However, this is not to limit the invention but only serves for illustration purposes.

Figure 1:
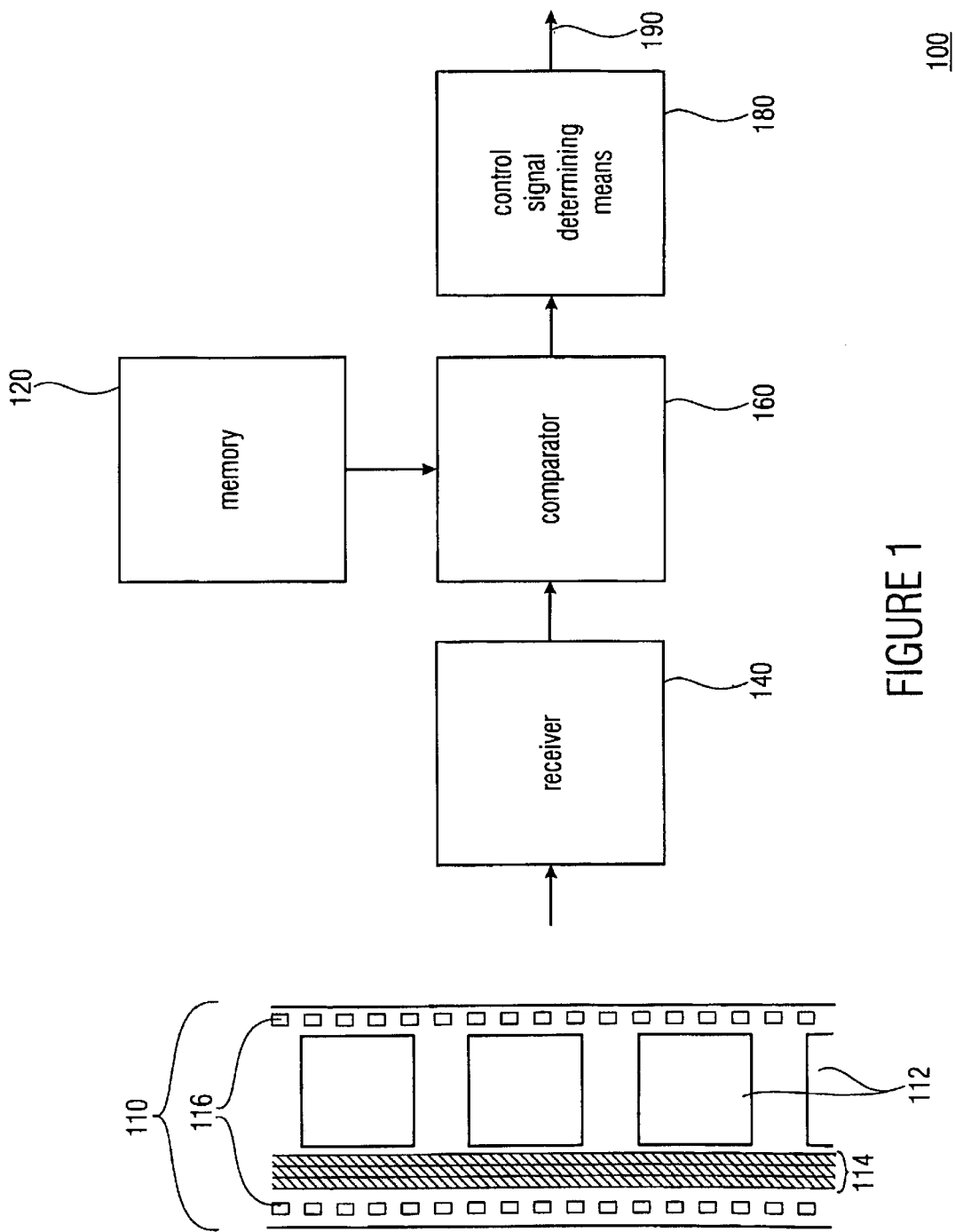
FIG. 1 is a basic block diagram of a preferred embodiment of an apparatus for generating a control signal for a film event system.

FIG. 1 shows a basic block diagram of an apparatus for generating a control signal for a film event system and an exemplary film 110, as has been explained above with regard to FIG. 8, wherein the apparatus for generating a control signal comprises a means for storing 120 the film information, a means for receiving a section read from the film 140, a means 160 for comparing the read section with the stored film information 112, 114 and a means 180 for determining the control signal based on the comparison and the time scale.

The stored video information 112, 114, comprises, for example, the sound or audio signals, respectively, the images or video signals, respectively, or also labels that can currently be found on films, and which determine, for example, where the aperture opens or from when on sound is played or when the film stops, respectively. The stored audio and/or video signals are, for example in digitized form, preferably in compressed form to reduce memory requirements.

An advantage of the digitized storage is the simple and particularly error-free reproducibility of the stored image of the film information.

In contrary to conventional systems, the film remains unchanged, as above-described, a stored image of the film information is generated only once, e.g. when producing the film.

When replaying the film via a film replay device, such as a film projector, for example, the sound signal contained on the soundtrack 114 is received by the means 140 for receiving and edited for the means 160 for comparing, sampled, for example, with a given sample rate and passed on as section of a given length or a given number of sample rates, respectively.

The means 160 is formed to compare this section read from the film with the stored film information, wherein the means 160 for comparing can be formed to compare the read section with the entire stored information, preferably, however, to compare the read section with a section of the stored film information to minimize the computing effort. The comparison can be made, for example, via crosscorrelation but also via calculating the difference, e.g. by calculating a compressed hash sum and searching the same in a database. The comparison can be based on the sound signal alone, the video signal alone, a comparison of the sound signal and the video signal as well as a combination with an evaluation of the above-mentioned features. Based on the result of the comparison of the means for comparing 160 and the time scale, the means 180 for determining determines the control signal 190. A film event system is controlled via the control signal 190, which generates, for example, WFS sound signals or subtitles based on the control signal 190 time synchronously to the replayed film 110. Thereby, the apparatus for generating a control signal or specifically the means for determining the control signal 180 can be formed such that the control signal is any time code format, proprietary or standardized such as the LTC time code format (LTC=longitudinal time code) standardized according to SMPTE (Society of Motion Picture and Television Engineers).

Time-synchronous means that the film event system generates, based on the control signal 190, a simultaneous event corresponding to the time on the time scale of a position of the film just replayed, to which a time on the time scale is associated in the stored film information.

Thereby, differing from the explained embodiment, instead of the film projector, any film replay device can be used, any film formats, such as silent films (e.g. with synchronization based on video information), films with analog or digital soundtrack, one soundtrack or several parallel soundtracks can be used, or as an alternative to a film, any other memory media can be used, such as tapes or hard drives, whose format can not or must not be changed, for example to be compatible to the film replay device in future, to which, however, other film events are to be synchronized at the same time.

In a preferred embodiment, the sound signal is used as film information for the synchronization. Thereby, the section read from the film is sampled with a given sample rate, which will be referred to below as test sample rate, to generate a test sound signal, and the stored film information is stored in digital form, wherein the stored film information will be referred to below as reference signal, and the test sound signal and the reference sound signal are compared in the means 160 for comparing via crosscorrelation.

In one embodiment, the test signal sample rate and the reference signal sample rate are invariable, i.e. constant. The means 160 for comparing can, for example, be formed to generate a first correlation result at a first time based on a first test sound signal and a first reference sound signal, to determine a first time of the time scale, and to generate a second correlation result at a second time based on a second test sound signal and a second reference sound signal to determine a second time of the time scale for determining, for example, a time difference or replay speed, respectively, or for determining a speed difference in comparison with a target or reference replay speed. Based thereon, the means 180 for determining determines the control signal for synchronizing, for example, the film event system.

However, it is a disadvantage of a constant sample rate that the correlation result decreases with varying test replay speed, and thus the accuracy of determining the time or position in the film becomes more inaccurate and thus the synchronization decreases. This disadvantage can be compensated by varying of the sample rates, which means the test sample rate and/or the reference sample rate.

FIG. 2 shows a basic block diagram of an apparatus for performing a correlation between a test sound signal that can be played with a variable replay speed, and a reference sound signal, which is a digitally stored version of the test sound signal, wherein the apparatus for performing a correlation comprises a means 210 for determining a measure for a test replay speed, a means 230 for varying a test sample rate or a reference sample rate and a means 250 for comparing. The means 230 is formed to vary a test sample rate, by which the test sound signal 270 is sampled, to generate the modified test signal 272 or to vary a reference sample rate to generate a modified reference sound signal based on the reference sound signal 274. Further, the means 230 for varying is formed to vary the test sample rate or a reference sample rate such that a deviation between a test replay speed associated to the test sound signal or reference replay speed associated to the modified reference sound signal 276 is reduced, or that a deviation between a test replay speed associated to the modified test sound signal 272 and a reference replay speed associated to the reference sound signal 274, or that a deviation between a test replay speed associated to the modified test sound signal 272 and a reference replay speed associated to the modified reference sound signal 276 is reduced, wherein the term replay speed or the problem of a variable replay speed, respectively, will be discussed below in more detail.

The means 250 for comparing the modified sound signal 272 and the reference sound signal 274, or the test sound signal 270 and the modified reference sound signal 276, or the modified test sound signal 272 and the modified reference sound signal 276 is formed to determine a result 278 of the correlation.

Figure 2A:
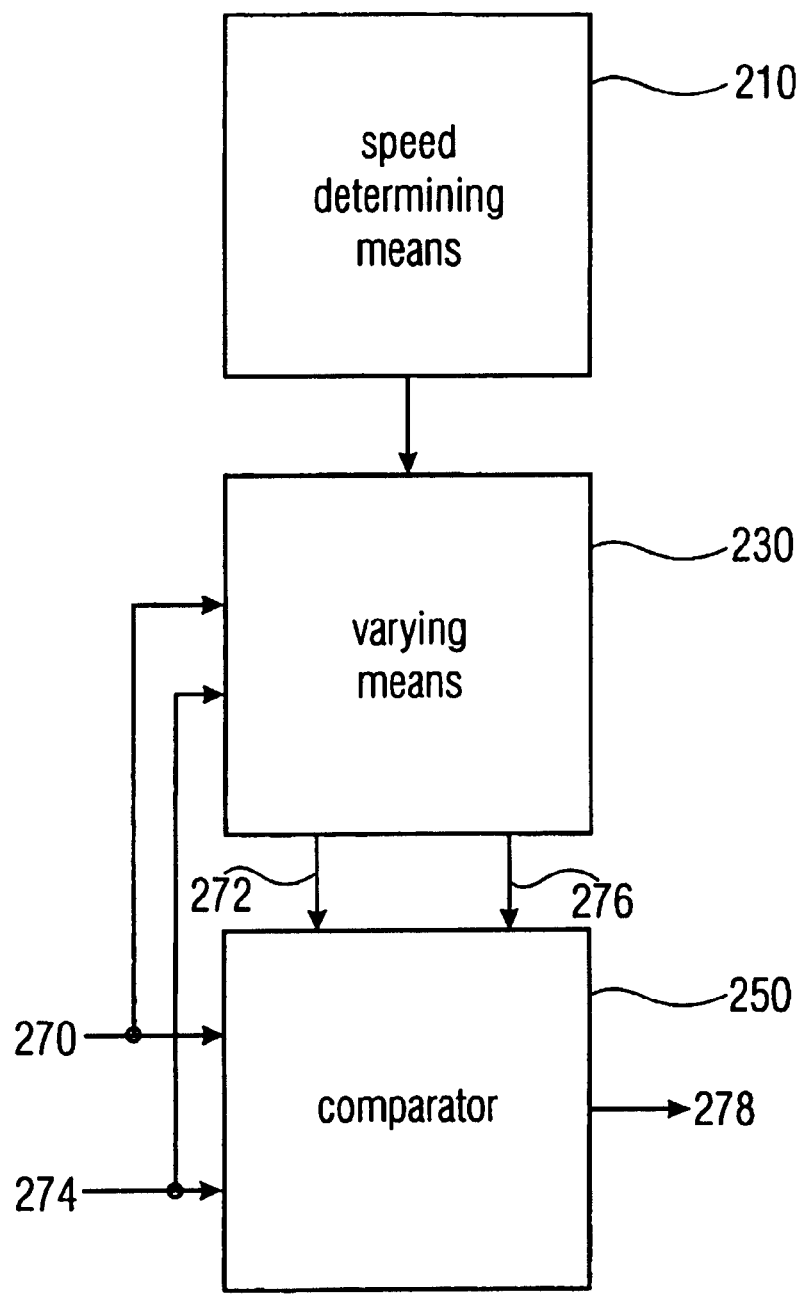
FIG. 2a is a basic block diagram of an embodiment of an apparatus for performing a correlation.

The embodiment of the apparatus for performing a correlation shown in FIG. 2*a* can, for example, be used as a means 160 for comparing in an apparatus for generating a control signal for a film event system, such as shown, for example, in FIG. 1.

Figure 2B:
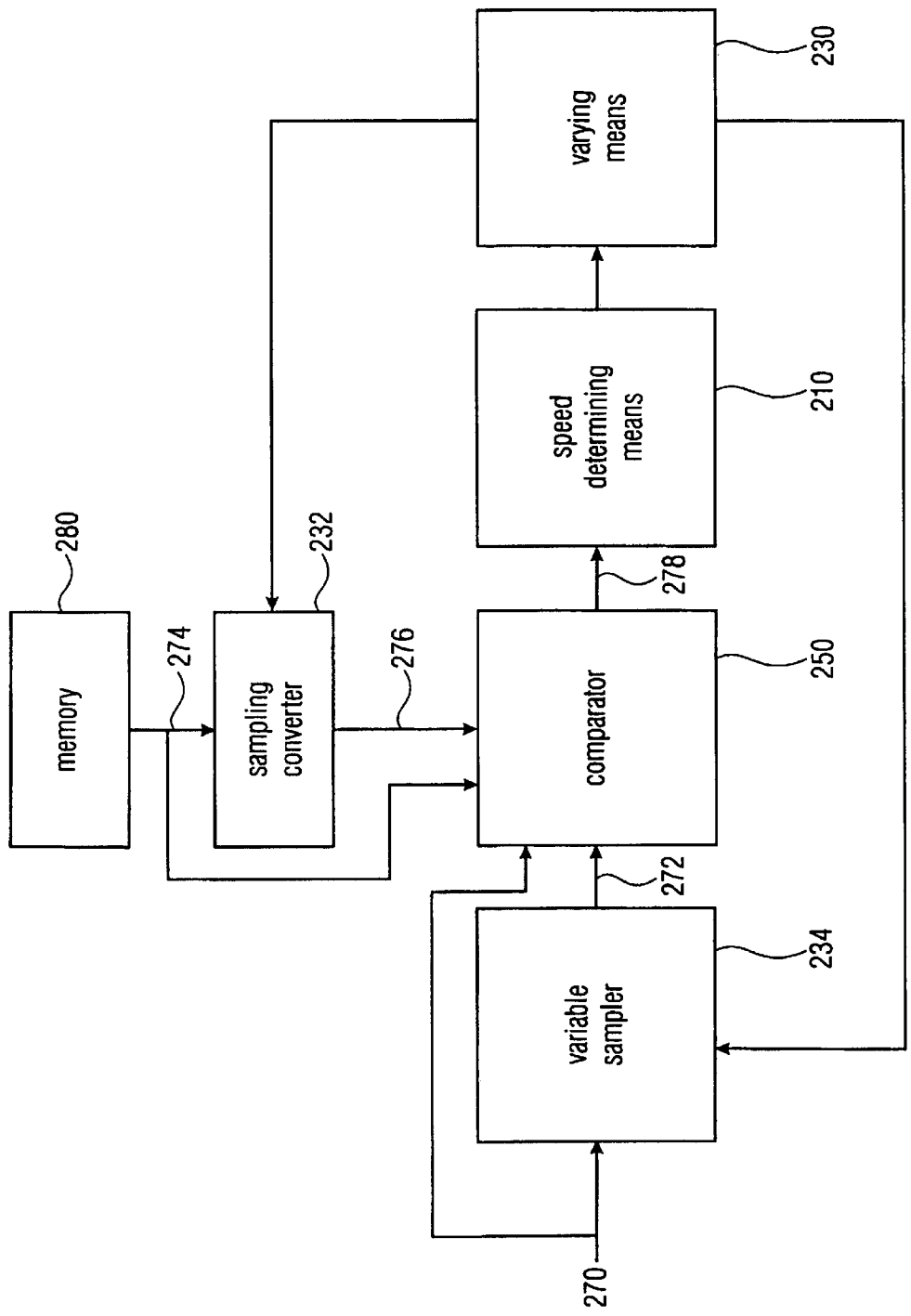
FIG. 2b is a basic block diagram of a preferred embodiment of an apparatus for performing a correlation.

FIG. 2*b* shows a basic block diagram of a preferred embodiment of an apparatus for performing a correlation between a test sound signal and a reference sound signal.

FIG. 2*b* shows a means 280 for storing a reference, sound signal 274, which is a digital version of the test sound signal 270, wherein the reference sound signal 274 has been generated once based on a given memory reference replay speed and memory reference sample rate.

The test sound signal is replayed with a variable test replay speed and sampled with a test sample rate to generate the test sound signal 270.

The means 210 for determining the measure for the test replay speed of the test sound signal 270 controls the means 230 for varying based on the measure for the test replay speed. The means 230 for varying controls a reference or sample rate converter 232 and a variable sampler 234, wherein the sample rate converter 232 is formed to convert a reference sound signal based on the memory reference replay speed and the memory reference sample rate into a modified reference sound signal 276 corresponding to a reference sound signal based on a different memory reference sample speed and/or memory reference sample rate, and wherein the variable sampler 234 is formed to sample the test sound signal with a varied sample rate differing from the standard or basic sample rate, to generate a modified test sound signal 272.

Differing from FIG. 2*b*, the apparatus for performing a correlation can also be formed such that the test sound signal 270 is always supplied to the means 250 for comparing via the variable sampler 234, wherein the variable sampler 234 is then formed such that one of the variable test sample rates corresponds to the standard or basic sample rate, and is further formed such that the reference sound signal 274 is always supplied to the means 250 for comparing via the reference sample rate converter 232, wherein the reference sample rate converter 232 is formed such that it passes the reference sound signal 274 in an unmodified way to the means 250 for comparing with respective control by the means 230 for varying.

The representation of the separate supply of the test sound signal 270 compared to the modified test sound signal 272 and the reference sound signal compared to the modified reference sound signal 276 to the means 250 for comparing selected in FIG. 2*b* serves to illustrate the alternative embodiments or realization possibilities.

Thus, for example, in one embodiment where the means 250 for comparing is formed to compare the modified test sound signal 272 with the non-modified reference sound signal 274, no reference sample rate converter 234 is required, or the apparatus for performing a correlation according to FIG. 2*b* has no reference sample rate converter 232, respectively. In the same way, a means 250 for comparing, which is formed to compare the unmodified test sound signal 270 to the modified reference sound signal 246, has no variable sampler 234.

In a further embodiment, the means 280 for storing is a means for storing film information, wherein a time scale is associated to the stored film information, and the test sound signal 270 is, for example, a film sound signal. The apparatus for performing a correlation according to FIG. 2*b* can then, for example, be used as means for comparing 160 according to FIG. 1.

FIG. 2*c*.1 shows a section of an exemplary film 110 with a soundtrack 114 as described above in FIG. 1. In FIG. 2*c*.1, two positions of the film 110 are indicated, a first position, further referred to as position $L_1$, and a second position, further referred to as position $L_2$. The two positions $L_1$ and $L_2$ define a section on the film 110 having a length of $\Delta L=L_1-L_2$.

FIG. 2c.2 shows an exemplary curve of the test sound signal associated to the section between the position $L_1$ and $L_2$ described in FIG. 2c.1, wherein further the time, when the position $L_1$ of the film is played, is referred to as time $T_1$, and the time when the position $L_2$ of the film is played is referred to as time $T_2$. The time period $\Delta T=T_1-T_2$ depends on the length of the respective section and the replay speed v of the film. The following applies:

$$\Delta T = \Delta L/v \text{ or}$$

$$T_2-T_1=(L_2-L_1)/v, \text{ respectively.}$$

When sampling the test sound signal with the sample rate $f=1/\Delta t$, wherein $\Delta t$ is the sample period and $\Delta T=n\cdot\Delta T$, the test sound signal can be illustrated as a sequence of n+1 samples, as indicated exemplarily in FIG. 2c.2 with n=10.

When replaying the film with a replay speed v and a sample rate $f=1/\Delta t$, the section of the film between $L_1$ and $L_2$ or $T_1$ an $T_2$, respectively, is divided, for example, in n time periods, or represented by n+1 samples, respectively. The following applies:

$$n=\Delta L/(\Delta t\cdot v) \text{ or}$$

$$n=\Delta L\cdot f/v, \text{ respectively.}$$

This means the number of sample periods or samples, respectively, for a given section of the film $\Delta L$ is proportional to the sample rate f or antiproportional to the sample period $\Delta t$, respectively, and antiproportional to the replay speed v. In other words, in a section of constant length $\Delta L$, the quotient "f/v" or the product "$\Delta t\cdot v$", respectively, has to be constant, when n or the number of samples n+1 is to be constant.

In that case, if the first sample is equal, the individual samples are also equal under the above-mentioned condition.

Correspondingly, when generating the stored film information or the reference sound signal, respectively, in a memory sample rate $f_{memory}$ and a memory replay speed $v_{memory}$, the stored section of the film information or the test sound signal, respectively, is represented, for example, by $n_{memory}+1$ reference samples and stored.

For illustrating the facts, FIGS. 2c.2 to 2c.4 show exemplary samples or storages of the film section between the position $L_1$ and $L_2$ for a constant sample rate f or a constant sample period $\Delta t$, respectively, and a variable sample speed, wherein FIG. 2.c2 shows an exemplary sampling or storing for a first replay speed $v_1$, FIG. 2c.3 shows a sampling or storing the same section of the film with a second replay speed $v_2$, and FIG. 2c.4 shows sampling of the same section of the film for a third sample speed $v_3$. Thereby, in this example, $v_1$ is half the size of $v_2$ and twice the size of $v_3$: $v_1=v_2/2$ and $v_1=2\cdot v_3$.

All three sound signals illustrated in FIGS. 2c.2 to 2c.4 have the same sample at the position $L_1$ or at the corresponding time $T_1$, respectively. Thus, correspondingly, as illustrated exemplarily in FIGS. 2c.2 to 2c.4, the stored image information or the reference sound signal in FIG. 2c.2 is represented by $n_1+1=11$ samples, in FIG. 2c.3 the same section of the film is represented by $n_2+1=6$ samples and in FIG. 2c.4 the same section of film is represented by $n_3+1=21$ samples.

As can be seen in FIGS. 2c.2 to 2c.4, with a constant sample rate, an increase of the replay speed v corresponds to a time compression of the sound signal, i.e. doubling of the replay speed $v_1$ of FIG. 2c.2 leads, as indicated in FIG. 2c.3 to halving $T_2-T_1$ and n, and a reduction of the replay speed v to a time extension of the sound signal, i.e. halving the replay speed $v_1$ of FIG. 2c.2 leads to doubling $T_2-T_1$ and n, as indicated in FIG. 2c.4.

FIGS. 2d.1 and 2d.2 correspond merely to FIGS. 2c.1 and 2c.2. Compared to FIG. 2c.1, FIG. 2d.1 shows two additional positions defining a search section or a search window with regard to the film and the film information applied thereon, wherein a first position of the search window is indicated by $L_0$ and a second position of the search window is indicated by $L_3$, wherein the section between the position $L_0$ and the position $L_3$ is greater than the section defined by positions $L_1$ and $L_2$, or $\Delta L_{window}>\Delta L$ with $\Delta L_{window}=L_3-L_0$ and $\Delta L=L_2-L_1$ applies. Correspondingly, in FIG. 2d.2, additionally to FIG. 2c.2, the time $T_0$ representing the time associated to the position $L_0$ based on the given replay speed, and the time $t_3$ representing the time associated to the position $L_3$ based on the given sample replay speed were added.

In relation to the generation of the stored film information or the reference sound signal and additionally stored time scale, respectively, this means that $T_0$ defines, for example, the time on the time scale associated to the position $L_0$, the time $T_1$ defines the time on the time scale associated to the position $L_1$, the time $T_2$ defines the time on the time scale associated to the position $L_2$, and the time $t_3$ defines the time on the time scale associated to the position $L_3$ on the film.

FIG. 2d.3 corresponds to FIG. 2c.2.

In the following, with regard to FIGS. 2d.2 to 2d.4, a basic curve of a comparison of two signals via correlation or the problematic of a variable replay speed when comparing two signals, respectively, will be exemplarily represented and discussed.

Thereby, FIG. 2d.3 illustrates currently read film information applied to the film or the test sound signal 270, respectively, and FIG. 2d.2 stored film information or a reference sound signal, respectively, wherein in an optimum case, which is represented by FIG. 2d.2 and FIG. 2d.3, the memory replay speed and the memory sample rate with which the reference sound signal has been generated, correspond to the replay speed of the test sound signal and the sample rate of the test sound signal or as above mentioned, the quotient of memory sample rate $f_{memory}$ and memory replay speed $v_{memory}$ corresponds to the quotient sample rate for the test sound signal f and replay speed of the test sound signal v, respectively. In that case, the reference sound signal or a section of the reference sound signal defined by $T_1$ and $T_2$, respectively, can correspond exactly to the test sound signal representing the section between $T_1$ and $T_2$, more precisely, their sample sequences, and a definite local maximum or a correlation peak can be gained via correlation, as illustrated exemplarily in FIG. 2d.4.

The position of the peak indicates the time shift of the test sound signal in relation to the reference sound signal or the search window, respectively. Based thereon, the current time can be determined with regard to the stored time scale.

In contrary to FIGS. 2d.1 to 2d.4, FIGS. 2d.5 to 2d.8 show an example where the replay speed of the test sound signal indicated in FIG. 2d.7 is reduced compared to the replay speed of the test sound signal as indicated in FIG. 2d.2.

FIG. 2d.5 corresponds to FIG. 2d.1. FIG. 2d.6 corresponds to FIG. 2d.2, that means FIG. 2d.6 represents an exemplary curve of a reference sound signal based on a memory sample rate $f_{memory}$ and a memory sample speed $v_{memory}$. FIG. 2d.7 shows an exemplary curve or an exemplary sample of the test sound signal, based on a test sample rate f unaltered in relation to 2d.3 or FIG. 2d.6, respectively, but an altered reduced replay speed v' of the test sound signal.

Relating to a time period ΔT under consideration, this means that in the same time period ΔT with reduced speed v' only a smaller section or a section of less length ΔL' according to ΔL'=v'·ΔT of the film is replayed, so that relating to the just played film after the time period Δ' only one position L'$_2$ prior to the position L$_2$ is reached, as illustrated in FIG. 2d.5. Relating to the reference sound signal and the time scale associated thereto, the time T'$_2$ of the time scale is associated to the position L'$_2$, as indicated in FIG. 2d.7.

Relating to the individual samples of the test sound signal, this means that the "spatial" curve of the test sound signal predetermined by the soundtrack of the film is invariable, so that with lower replay speed, v' corresponds to a sample period Δt or a corresponding spatial sample section Δl', respectively, which is smaller than Δ1, so that, as indicated in FIG. 2d.7 compared to FIG. 2d.6, the samples of the test sound signal "migrate" towards the left with regard to the "spatial" signal curve.

In the opposite case where the altered replay speed v' is greater than the memory replay speed v$_{memory}$, the opposite case occurs, where in the same time period Δt a longer spatial section Δ1 is played, so that the samples of the test sound signals "migrate" towards the "right" on the signal curve in the "spatial" curve of the test sound signal.

Thus, with an altered replay speed, regardless whether it is higher or lower than the memory replay speed, the result of the comparison decreases, since even with otherwise optimum conditions, the test sound signal and the reference sound signal reproduce two different spatial sections of the film. The result of the comparison becomes the worse the more the memory replay speed deviates from the test replay speed. When comparing by correlation, the amount of the local maximum or peak decreases and the maximum itself becomes broader and flatter, so that the time determination with regard to the time scale becomes more and more inexact until it is no longer possible.

Under real conditions, the replay speed of the test sound signal varies, for example, not only between different film projectors but can also vary during a film. Thus, accurate retuning is essential to ensure synchronism during the whole film.

Thus, the apparatus for performing a correlation varies the sample rate of the test sound signal or the sample rate of the reference sound signal to minimize the adverse effect of a variable replay speed of the test sound signal as described above according to the above-described condition that the quotient of sample rate and replay speed of the test sound signal and the reference sound signal have to be the same in order to represent the same section of the film with the same samples.

In a digital reference sound signal that has been generated before with a memory sample rate, the change of replay speed is effected by sample rate conversion, wherein the stored reference sound signal 274 is, for example, correspondingly interpolated to generate a reference sound signal with the sample rate corresponding to the altered replay speed.

FIGS. 2d.1-2d.8 represent simplified examples, where it has been assumed for clarity reasons that the memory replay speed v$_{memory}$ corresponds to a normal or common replay speed of a player for generating a test sound signal. As explained above, however, the quotient of sample rate f and replay speed v is the amount that has to be same for the reference sound signal and the test sound signal, in order to be able to represent the same section of the film with the same samples, as discussed above. For example, when generating the reference sound signal, double replay speed can be used when the sample rate is doubled at the same time.

In an embodiment according to FIG. 2b the means 210 for determining can determine a measure for the test replay speed based on the result 278 of the correlation.

One approach is to use a single correlation result for the determination of a measure of the replay speed by comparing, for example, an amplitude of a peak with a given threshold to determine whether a deviation between a replay speed of a test sound signal and a reference sound signal lies within in a given range.

In a preferred embodiment, at least two different reference sound signals based on different reference sample rates or corresponding to different reference replay speeds, respectively, are compared to the test sound signal to compare the results of the correlation, for example, via quality evaluation, which is discussed in more detail with reference to FIG. 5 in order to determine from the same a most similar reference sound signal and thus a measure for the replay speed of the test sound signal based on the known sample rate and the known memory replay speed. Thereby, the different reference sound signals can be formed successively and compared to the test sound signal or can be formed and compared simultaneously.

A particularly preferred embodiment of the apparatus for performing a correlation generates three reference sound signals based on different reference sample rates, wherein the reference sound signal of the medium of the three sample rates is based on the reference sample rate of the reference sound signal which had the best quality or maximum match with the test sound signal, respectively, in a previous comparison and wherein the two other reference sound signals have each a reference sample rate, which is higher or lower than the reference sample rate of the medium reference sound signal or reference sample rate, respectively. This is controlled by the means 230 for varying based on an output signal of the means 210 for determining the measure for the test replay speed. Thus, it is ensured that the reference sample rate or the reference replay speed of the reference sound signal, respectively, is adapted to the replay speed or reference sample rate of the test sound signal, respectively.

Figure 3A:
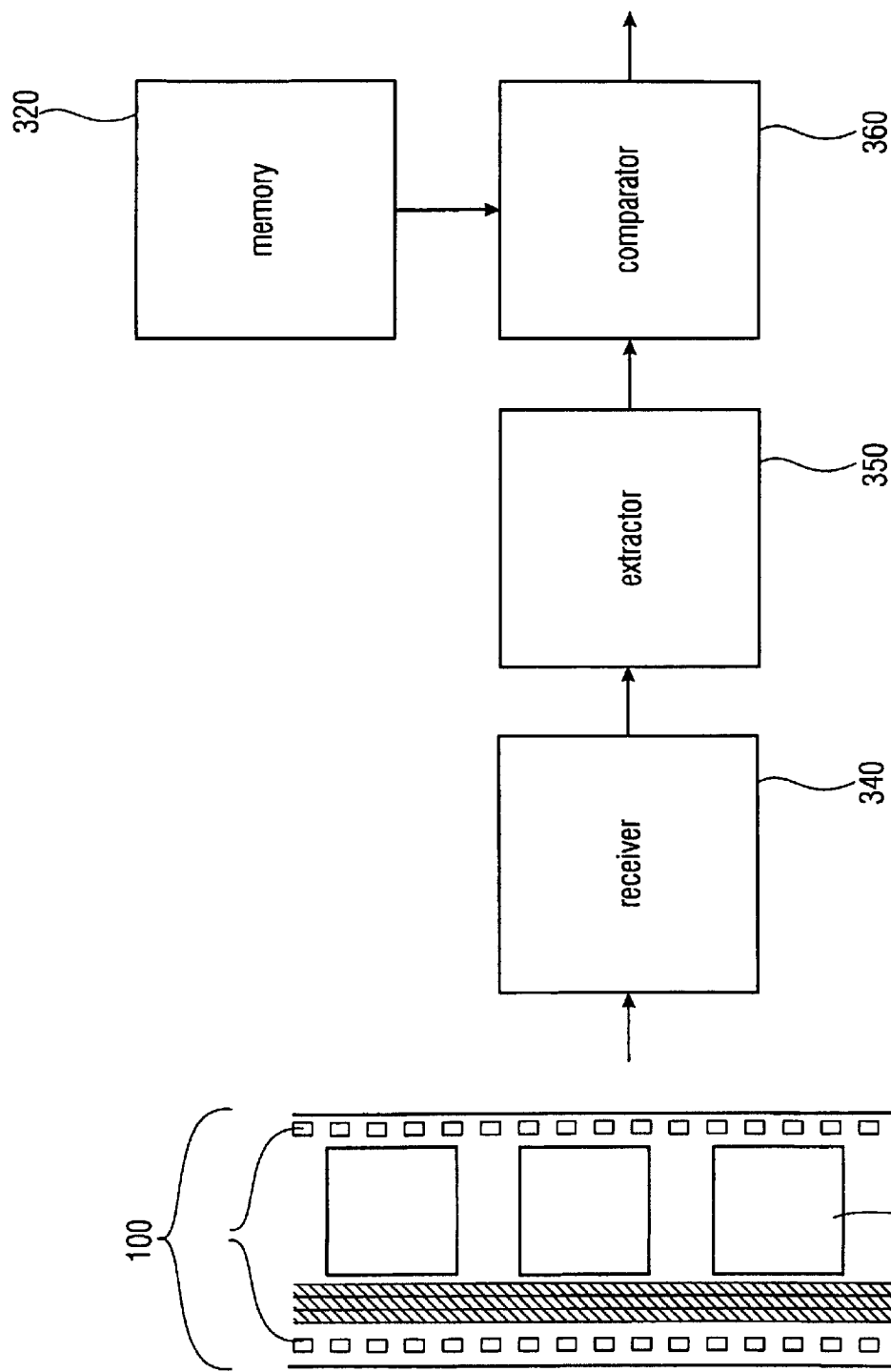
FIG. 3a is a basic block diagram of a preferred embodiment of an apparatus for determining a part in the film based on a fingerprint representation.
Figure 8:
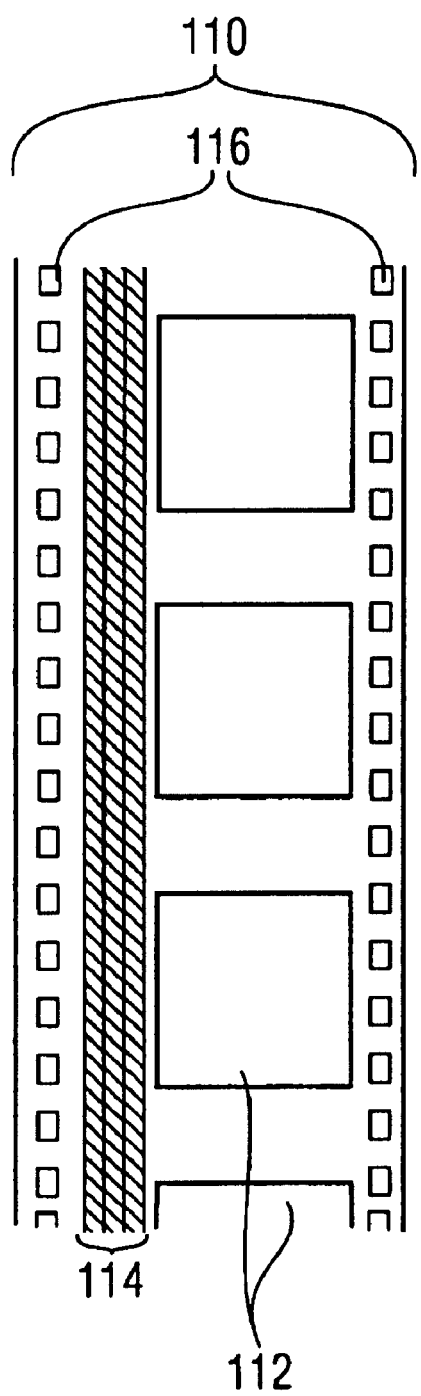
FIG. 8 is a schematic representation of an exemplary film with applied film information.

FIG. 3a shows an exemplary film as illustrated in FIG. 8 and a basic block diagram of an apparatus for determining a position in the film.

The embodiment of the apparatus for determining a position in a film shown in FIG. 3a can, for example, be used in an apparatus for generating a control signal for a film event system, as shown, for example, in FIG. 1, as means 180 for determining the control signal.

The apparatus for determining a position in a film comprises a memory 320 for storing a reference fingerprint representation of the film information, wherein the fingerprint representation is formed such that a time curve of the fingerprint representation depends on a time curve of the film information, and wherein a time scale is associated to a stored reference fingerprint representation, a means 340 for receiving a section read from the film, a means 350 for extracting a test fingerprint representation from the read-in section and a means 360 for comparing the test fingerprint representation to the reference fingerprint representation to determine the position in the film based on the comparison and the time scale.

In a preferred embodiment, the fingerprint representation comprises a representation in form of a spectral flatness, wherein a time curve of the fingerprint representation comprises a time curve of the spectral flatness.

FIG. 3b.1 shows an exemplary film 110, as illustrated in FIG. 8. Thus, during playing the film with a given replay speed, for example, the time T$_{100}$ of the time scale corresponds to a position L$_{100}$ of the film, the time T$_{103}$ of the time scale to a position $L_{103}$, the time $T_{113}$ of the time scale to a position $L_{113}$ and the time $T_{116}$ of the time scale to a position $L_{116}$.

In the step of generating the reference fingerprint representation of the film information, in one embodiment, a fingerprint is determined for certain spatial or time portions of the film, respectively.

FIG. 3b.2 shows, for example, a first section comprising the section from the position $L_{100}$ to $L_{113}$ or $T_{100}$ to $T_{113}$, respectively, and a second section comprising the section from the position $L_{103}$ to the position $L_{113}$ or from the time $T_{103}$ to the time $T_{116}$, respectively. Based on these sections, a fingerprint associated to the section is generated based on, for example, spectral analysis, Fourier transformation or other methods of feature extraction. In a particularly preferred embodiment, the fingerprint comprises the spectral flatness $\gamma_x^2$, which is calculated from the curve of the power density spectrum, so that the value of the spectral flatness is determined for every section, and a sequence of spectral flatnesses results in dependence on the time curve of the film information, for example the sound signal, which is stored in the memory 320 with the associated time scale.

Sample rate, length or duration of the section, respectively, or the distance between two subsequent sections are determined according to the requirements, for example, with regard to uniqueness or accuracy of the determination of the position in the film. The longer the section the clearer the specification of the feature in general, the higher the sample rate and/or the smaller the distance between two sections the more accurately the position in the film can be determined. The higher the sample rate the longer the sections and the lower the distances between the sections, the higher the memory requirement for the reference signal or the requirements of computing power signal processing.

A significant advantage of the fingerprint representation in form of spectral flatness is its lower memory requirement compared to, for example, a complete storage of the power density spectrum for an equal section. Preferably, a curve or sequence of spectral flatnesses, respectively, is used as fingerprint for a section.

Figure 4:
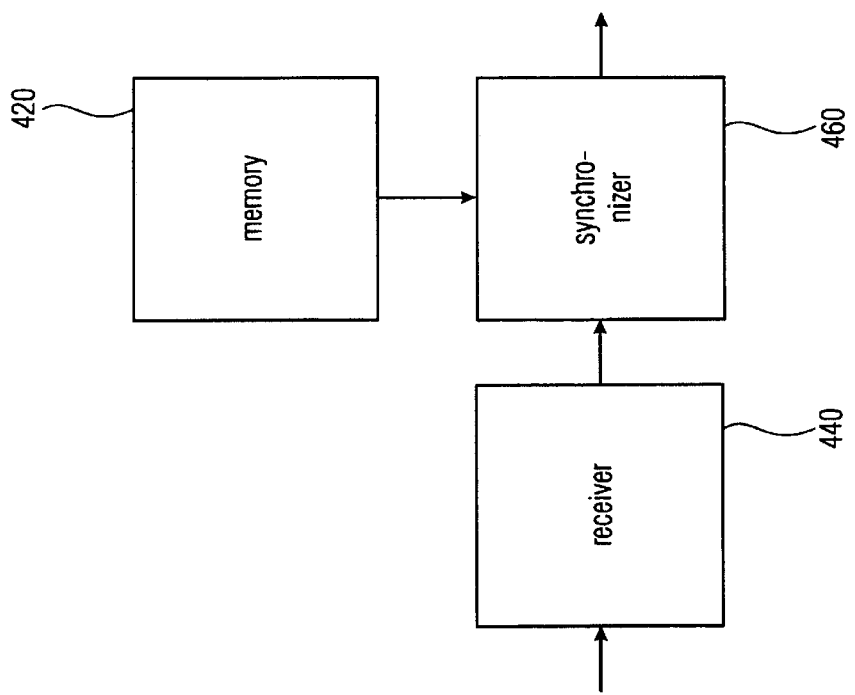
FIG. 4 is a basic block diagram of a preferred embodiment of an apparatus for determining a position in the film based on a coarse and a subsequent fine determination of the position.
Figure 4:
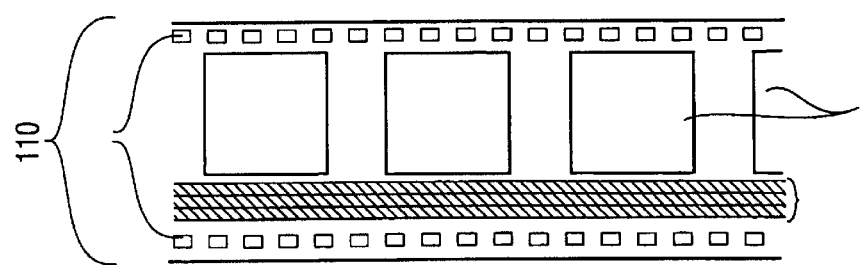

FIG. 4a shows an exemplary film 110, as indicated in FIG. 8, as well as an apparatus for determining a position in a film having film information applied in a time sequence.

The embodiment of the apparatus for determining a position in a film shown in FIG. 4a can, for example, be used in an apparatus for generating a control signal for a film event system such as shown in FIG. 1, as a means 180 for determining the control signal.

The apparatus for determining a position has a memory 420 for storing film information applied to a film in time sequence, wherein a time scale is associated to the stored film information, a means 440 for receiving a section read from the film and a synchronization means 460, which is formed to compare a sequence of samples of the read portions based on a first sample rate and a first search window of the stored film information to obtain a coarse result and to compare a sequence of samples of the read section based on a second sample rate and a second search window of the stored film information to obtain a fine result pointing to the position of the film, wherein a position of the second search window in the stored film information depends on the coarse result, and wherein the first search window is longer in time than the second search window and wherein further the first sample rate is lower than the second sample rate.

Figure 5A:
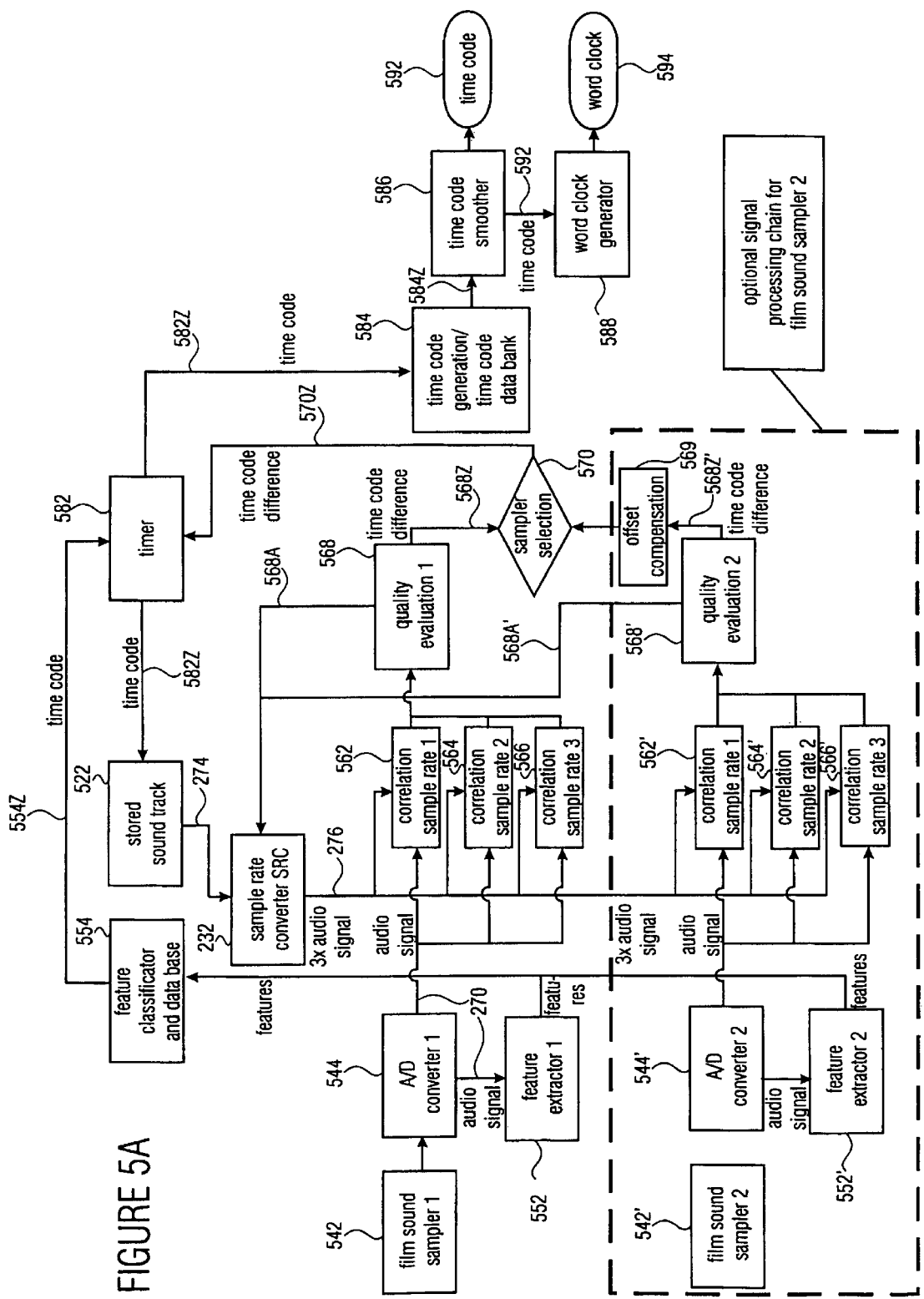
FIG. 5a is a basic block diagram of a preferred embodiment of an apparatus for generating a control signal for a film event system.

FIG. 5a shows an exemplary film 110, as indicated in FIG. 8, as well as a preferred embodiment of an apparatus for generating a control signal for a film event system, which is formed to determine the control signal based on an analog soundtrack applied to the film of a section of the audio signal or test sound signal, respectively, read from the film, and a stored digital version of the test sound signal, referred to as reference sound signal below, to which a time scale is associated, by comparing the test sound signal and the reference sound signal via the time scale.

FIG. 5a shows a preferred embodiment of an apparatus for generating a control signal for a film event system having a first film sound sampler 542, which is connected to a first A/D converter 544 (A/D=analog/digital), wherein the first A/D converter 544 is connected to a first feature extractor 552, a first means 562 for correlation with a first reference sound signal based on a first sample rate, with a second means 564 for correlation with a second reference sound signal based on a second sample rate, and a third means 566 for correlation with a third reference sound signal based on a third sample rate. An input of the first means 562 for correlation, an input of the second means 564 for correlation, and an input of the third means 566 for correlation are connected to an output of a sample rate converter (SRC) 232.

An output of the first means 562 for correlation, an output of the second means 564 for correlation and an output of the third means 566 for correlation are connected to an input of a first means 568 for quality evaluation. The means 568 for quality evaluation again is coupled to the sample rate converter 232 and a means 570 for sampler selection, wherein an output of the means 570 for sampler selection is connected to an input of a timer 582. The timer 582 again is connected to the stored soundtrack or a means 522 for storing the soundtrack, respectively, wherein an output of the means 522 for storing the soundtrack is connected to an input of the sample rate converter 232.

An output of the first feature extractor 552 is connected to an input of means 554 for comparing a feature having, for example, a feature classificator and a database of features, wherein an output of the means 554 for comparing a feature is connected to an input of the timer 582.

An output of the timer 582 is coupled to an input of a means 584 for time code generation, which has a time code database or is coupled to a time code database, wherein further an output of the means 584 for time code generation is connected to an input of means 586 for time code smoothing, wherein the means 586 for time code smoothing is further formed to output a time code 592, wherein further an output of the means 586 for time code smoothing is connected to an input of a word clock generator 588, which is further formed to output a word clock signal 594.

Optionally, the apparatus for generating a control signal for a film event system further has a second film sound sampler 542', which is connected to a second A/D converter 544', wherein the second A/D converter 544' is connected to a second feature extractor 552', to a fourth means 562' for correlation with a fourth reference sound signal based on a first sample rate, to a fifth means 564' for correlation with a fifth reference sound signal based on a second sample rate and to a sixth means 566' for correlation with a sixth reference sound signal based on the third sample rate.

An output of the fourth means 562' for correlation, an output of the fifth means 564' for correlation and an output of the sixth means 566' for correlation are connected to an input of a second means 568' for quality evaluation, wherein an output of the second means 568' for quality evaluation is connected to an offset compensation 569 and a further output to an input of the sample rate converter 232, and wherein further the means for offset compensation 569 is connected to the sampler selection 570.

Thereby, the first film sound sampler 542, also referred to as main sampler, is positioned such that the apparatus for generating a control signal has enough time to synchronize. Thus, the first film sound sampler 542 provides a predelayed signal. At the time of synchronization, the correlation window width or width of the section of the test sound signal is added. Based on the perforations on the spool of film, the time difference for the predelay can be adjusted accurately. Three seconds are recommended as first basis.

Below, the mode of operation of the embodiment of the apparatus for generating a control signal for the film event system will be discussed in more detail, wherein the principle will be discussed based on the test sound signal generated by the first film sound sampler 542 or its signal processing chain, respectively, since the second optional signal processing chain or signal processing of the test sound signal generated by the second film sound sampler 542', respectively, corresponds to the first and thus merely the means 569 for offset compensation will be discussed in detail.

The first film sound sampler 542 reads the sound signal from the soundtrack of the film or samples the sound signal from the soundtrack of the film, respectively, and passes this signal on to the first A/D converter 544, wherein the first A/D converter 544 is formed to generate a digital audio signal or test sound signal based on the sample rate of the first film sound sampler 542 and the replay speed of the film from which the soundtrack or film information, respectively, is read.

Based on the test sound signal 270, one or a plurality of features is extracted or a test fingerprint representation is formed, respectively. For the feature extraction or fingerprint representation, respectively, for example the spectral flatness is used as feature or fingerprint, respectively. The test fingerprint representation is then compared to a reference fingerprint representation by the means 544 for comparing a feature or a fingerprint representation, respectively, wherein, as mentioned above, the fingerprint representation is formed such that a time curve of the fingerprint representation depends on a time curve of the film information, and wherein a time scale is associated to a reference fingerprint representation stored in a means 544 for comparing a feature, and a means 554 for comparing is formed to determine a position in the film or to generate a time code signal 544Z, respectively, based on the comparison of the test fingerprint representation with the reference fingerprint representation and the time scale.

Based on the stored reference sound signal 274, the sample rate converter generates the same signal with slightly different sample rates, i.e. modified reference sound signals for the correlations to be calculated in parallel. F. Thereby, the case that a modified reference sound signal has the same sample rate as the original reference sound signal, is included, so that for the discussion of FIG. 5 below generally the term reference sound signals is used.

In other words, the sample rate converter 232 generates three reference sound signals 276 or modified reference sound signal 276, respectively, wherein a first reference sound signal is based on a first sample rate and supplied to the first means 562 for correlation, wherein a second reference sound signal 276 is based on a second sample rate and supplied to the second means 564 for correlation, and the third reference sound signal 276 is based on a third sample rate and supplied to a third means 566 for correlation. The sample rate converter 232 provides slightly stepped signals, with different sample rates, to the correlation or the means 562, 564, 566 for correlation, respectively, wherein the sample rate is always adjusted in dependence on the previously measured maximum peak to noise value from the correlation. One correlation each receives the modified reference sound signal with this sample rate, a further correlation receives a further slightly lower one, which is one step lower, and a further correlation receives a slightly higher stepped sample rate. Thereby, it is ensured that the sample rate converter can tune or synchronize, respectively, to a speed change of the analog sound signal.

The means 522 for storing the soundtrack and the sample rate converter 232 are preferably formed to use a window width of $2^n$, to calculate large calculation windows via fast Fourier transformation (FFT) with little effort. More than three correlations can be calculated in parallel to compensate for sudden jumps in the sound check. The correlation window is selected large to obtain a significant correlation peak. To obtain the detection accuracy of the correlation peak in a sample or a sample period, respectively, oversampling of the input signal or test sound signal, respectively, can be used.

The means 522 for storing the soundtrack outputs the reference sound signal in the length of the correlation window in dependence on the supplied time code signals 582Z of the timer 582, wherein the correlation window is the search window wherein the test sound signal is searched.

The first means 568 for quality evaluation is formed to perform a maximum value search in the result of the cross-correlation of the signals or the amounts of the signals, respectively, and to weight the quality of the result of the crosscorrelation depending on the height of the correlation peak compared to other peaks and the crosscorrelation or to determine the quality of every individual correlation with regard to the peak to noise distance, respectively.

Based on the quality evaluation, the reference sound signal with the best quality factor or quality, respectively, is determined, and based on the position of the peak of the reference sound signal with the best quality or quality factor, the shift of the peak in relation to the search window is determined, and, for example, output as time code difference between measured and actually valid time code or as relative time code.

Depending on the result of the quality evaluation, the first means 568 for quality evaluation sends a control signal 568A to the sample rate converter 232, which, for example, differentiates only the three signal values "0", "+1", and "−1", wherein, for example, with "0", the sample rates of the last sample rate conversion or correlation, respectively, are maintained, because the correlation result from the modified reference sound signal with the medium sample rate has been determined as the one with the highest quality, wherein with "+1", the sample rates are increased by one step in relation to the last sample rate conversion or correlation, respectively, because the correlation result from the modified reference sound signal with the highest sample rate has been determined as the one with the highest quality, and with "−1", the sample rates are reduced by one step in relation to the previous sample rate conversion or correlation, respectively, since the correlation from the test sound signal and the modified reference sound signal with the lowest reference sample rate had the best correlation result or the best peak to noise distance, respectively.

In other words, depending on with which sample rate (first, second or third) the best correlation peak has been obtained, the sample rate converter is increased or decreased, e.g. by a sample rate delta value or controlled such that it performs no sample rate conversion.

Thereby, the correlation serves for addressing two main aspects. First, the determination of the position in the film or determination of the time in the film, respectively, based on the time code difference from the correlation. Second, the determination of the measure for the replay speed to determine the optimum reference sample rate or optimum sample rate conversion of the reference sample rate, respectively. Here, the adaption of the sample rates or the generation of adapted sample replay speeds, respectively, again allows improved correlation results and thus improves the time determination or determination of the position in the film, respectively, and thus improves synchronization and prediction.

A preferred embodiment according to FIG. 5 is performed to detect signal parts with certain characteristics via signal analysis to suppress them during synchronization and thus avoid wrong detections or synchronizations, respectively, or to avoid random variations of the time axis.

Such characteristics can, for example, be the loudness of the signal component or the "problems" of a signal and the signal analysis or detection of problematic components can be based on SNR (signal to noise ratio), PNR (peak to noise), spectral power or power density spectrum, spectral flatness or averaging of a time sequence.

Below a threshold of the peak noise value or the peak noise distance, the time code difference can, for example, be detected as invalid. Or if several peaks with similar peak noise distance are determined, the time code difference can also be detected as invalid.

Further, the quality of correlations with quiet signal components, i.e. signal components with low amplitudes, is lower than the one of correlations with loud signals due to the higher quantization noise during digital sampling compared to, thus, quiet signal components are suppressed based on thresholds or adaptively, to avoid random variations of the time axis. Additionally, the signal energy can be a further quality feature.

A further example is suppression of problematic, because repetitive signal components to avoid ambiguities and thus, for example, wrong synchronization.

Problematic signal components or portions, respectively, can further be signalized as metadata, for example, to suppress these signal components independent of the quality of the current correlation.

The means 584 for time code generation is formed to convert based on the time code signal 582Z of the timer 582, which can, for example, be based on an internal or proprietary time code, for example into a standardized time code or a time code signal based on a standardized time code.

The timer 582 is controlled by an internal clock (interval or frequency of the correlations), a coarse audio ID fingerprint or fingerprint representation, for example the time code signal 554Z from the feature determination or fingerprint representation, and the determined correlation difference, for example the time code difference signal 570Z determined from the correlation of the means 570 for sampler selection. The timer has to perform a prioritization of correlation signal (highest priority), time code from feature determination and internal clock (lowest priority).

The means 586 for time code smoothing is formed to smooth the time code signal 584Z, to so, for example, avoid a highly jumping time code or to find useful intermediate values if there are no time codes from the correlation, to compensate, for example, breaks in the analog sound. The time code signal 592 generated by the means 586 for time code smoothing is preferably a standardized time code, by which the film event system is synchronized or controlled, respectively. However, the time code signal 592 can also be used to generate the corresponding sample clock via a slowly regulating phase locked loop (PLL), if the included sound replay system is digital. Such phase locked loops are available as complete devices and thus no subject matter of the patent.

Optionally, more than one film sampler with time different offset from the projection lens can be used for improving the robustness with damages of the film or for the synchronization of unsuitable portions, respectively.

A second film sound sampler 542' can then, for example, be used, since the second film sound sampler 542' already exists in conventional cinema systems. Breaks in the analog sound can here be bridged by the film sound samplers 542, 542' applied at different positions on the cinema film, since with short breaks in the film sound the probability increases that at least one sampler, either the first film sound sampler 542 or the second film sound sampler 542' provides enough signal for a correlation and the associated synchronization.

Further, optionally, different samplers, e.g. for analog sound, Dolby digital sound (including decoder), DTS digital sound (including DTS decoder) or a different sound as well as a combination of the above-mentioned can be used as reference soundtrack and/or test soundtrack.

Here, individual tracks can be used for the comparison by using averaging, majority decision or prioritization, automatically or via metadata of the generated time information as well as a downmix on mono.

Generally, different samplers can be used for different sound formats and/or different film samplers with offsets different in time.

The usage of a downmix on mono has the advantage that when the monotrack is used as stored soundtrack, needs to be stored compared to storing, for example, five channels.

The storage of several, i.e. more than one soundtrack, i.e. no downmix, means that all channels are stored independently of each other and that then, for example, as discussed above, corresponding comparisons or majority decisions have to be performed to perform the synchronization by using a certain channel, the actual soundtrack and a corresponding channel of the stored soundtrack.

The initialization phase or first synchronization and the synchronization, respectively, after a sound break from two critical phases during film projection or a synchronization of a film event system, respectively.

Thus, preferred embodiments calculate more than three parallel correlations in the beginning, since no synchronization has been performed, this means more than three reference sound signals of different sample rates are compared or correlated, respectively, with the test sound signal to determine the correct sample rate or sample speed of the test sound signal as fast as possible. Here, different sample rates can be tested one after other until one of the correlation has the best signal noise distance.

Alternatively or additionally, the first feature extractor 552 and the means 554 for feature classification provide, together with the database, a coarse absolute time code value defining a coarse position in the film, to perform in a second step, for example by the correlation, a fine determination of the position of the film or a fine time code determination, respectively. As soon as the synchronization has been made, three correlations can be used to synchronize changes of the replay speed of the test sound signal during film projection.

The accuracy with which a position in a film or the time associated to the position, respectively, can be associated to the time scale (time code), depends on the sample rate of the reference sound signal and the sample rate of the test sound signal, the higher the sample rate the more exact the position in the film can be determined. However, a lower sample rate has the advantage that with the same number of samples a longer section of the reference sound signal or the test sound signal can be represented. Thus, a preferred embodiment is formed to determine in a first step a coarse determination of a position in a film by representing a longer section of the film by a reference sound signal with lower sample rates, and a test sound signal is also gained by sampling with a lower sample rate. Then, in a second step, based on the coarse position in the film, a reference sound signal of higher sample rate and a test sound signal of higher sample rate are used for a fine determination of the position in the film.

In other words, the window length is adapted during correlation. At the beginning of the search, windows with long timing but a reduced sample rate of the signals are used, but when a time is to be found approximately and is only to be followed, short windows are used, even with oversampling of the signals to obtain a higher time accuracy.

In the initialization phase, for example, a "compatible replay" of the "old" audio format can be performed until the exact position is determined.

In the same way, a "compatible replay" of the "old" audio format can be performed when the synchronization has been clearly lost until the exact position is determined again.

The means 570 for sampler selection and the means for offset compensation 569 are only required in embodiments with more than one film sound sampler. Thus, for example, the means 570 for sampler selection decides whether the result or the time code difference of the first means 568 for quality evaluation 568Z, respectively, or the result or the time code difference 568Z' of the second means 568' for quality evaluation, respectively, is passed on to the timer 582 for determining a position in the film or a time code 582Z, respectively. Since the second film sound sampler 542' samples the test sound signal at a different position of the film, the difference (offset) between the position where the first film sound sampler 542 samples the film to the position where the second film sound sampler 542' samples the film is compensated by the means 569 for offset compensation, so that the timer 582 obtains the correct time code difference 570Z, regardless whether the time code difference 568Z or the time code difference 568Z' is selected with regard to the last stored time or the last stored position of the film, respectively, stored in the timer.

Differing from the embodiment illustrated in FIG. 5a, the different reference sound signals of different reference sample rates can also be generated successively and compared or correlated, respectively, to the test sound signal to determine the measure for the replay speed of the test sound signal or the optimum reference sample rate, respectively. Alternatively, more than three modified reference sound signals can be compared to the test sound signal, parallel or serial, to allow a fast synchronization not only in the initial phase but also to synchronize the film event system during film projection more quickly to the current position in the film after larger jumps in the film, e.g. caused by cuts or portions missing in the film.

Differing from the embodiment illustrated in FIG. 5, a synchronization of a film event system can also be performed based on the pictures applied to the film, both for an evaluation of features or fingerprints, respectively, and for a correlation of a test image signal with one or a plurality of reference image signals.

Thereby, as illustrated above, the correlation of audio and/or video signals can be used for determining the time space in an audio and/or video stream, and synchronous replay can be controlled due to this time determination.

Alternatively, the determination of an audio and/or video signature from the raw material in the form of an audio ID/video ID (ID=identification) can be used for coarsely determining the time in a long AV stream to enable synchronization at any position.

The basic approach of the invention is to store the already existing analog sound again in digital form to synchronize onto the cinema film with the analog soundtrack via correlation and other feature determination. The output signal or control signal, respectively, of the apparatus for generating a control signal or the synchronization device, respectively, can be any time code format. Preferably, the SMPTE standardized LTC time code format is used. For every cinema film, during production, a dataset has to be generated for the apparatus for generating a control signal or for the synchronization device, respectively.

During production, a separate data carrier is generated for every cinema film for the above-described means for generating a control signal or a synchronization device, respectively. The data carrier contains the digitized analog soundtrack, e.g. in Dolby stereo format, as can be found on the spool of film, feature data to the soundtrack and matching time codes.

In the following, an exemplary determination of a time code difference is described with reference to FIGS. 5b.1 to 5b.4.

FIG. 5b.1 shows an exemplary film 110 with a soundtrack 114 as already described in FIG. 8.

Based on the time code signal 582Z of the timer 582, a reference sound signal 274 is read out from the means 522 for storing a soundtrack and a modified reference sound signal is generated according to FIG. 5b.2 via the apparatus for sample rate conversion 232, which represents a film section from the position $L_0$ to the position $L_3$ or the time $T_0$ associated to the position $L_0$ or a corresponding time code and the time $T_3$ or time code, respectively, associated to the position $L_3$.

FIG. 5b.3 shows an exemplary test sound signal or section of a test sound signal, respectively, which is defined by the starting time $T_1$ and the end time $T_2$ and has been generated based on the sample rate $f=1/\Delta t$.

FIG. 5b.4 shows the result of the correlation of the modified reference sound signal according to FIG. 5b.2 and the section of the test sound signal FIG. 5b.3. The time difference $\Delta T''=T_1-T_0$ between the starting time $T_0$ of the search window or modified reference sound signal of FIG. 5b.2 and the time $T_1$ of the search window or reference sound signal, respectively, is the time shift based on which the time code difference or the relative time code, respectively, is formed. Thereby, the time $T_1$ is the time or the time shift of the test sound signal where a section of the reference sound signal, which is n=11 samples long, maximally matches the test sound signal or a correlation of the reference sound signal and the test sound signal, which is N=11 samples long, has a maximum as correlation result, respectively.

Thereby, knowledge of the absolute time $T_0$ or the time $T_1$ is not required for quality evaluation 568, since, for example, the timer 582 knows the last absolute time or absolute time code, respectively, and only requires the time code difference 570Z to determine the updated absolute time or time code, respectively. The difference can for example be illustrated from the position of the peak in relation to the time of the beginning of the search window. In FIG. 5b.4, the peak is, for example, the first sample, i.e. the test sound signal of FIG. 5b.3 is shifted by "3·Δt" in relation to the reference sound signal of FIG. 5b.2, wherein Δt is the sample period corresponding to the modified sample rate.

Thus, the time code difference 570Z can consist, for example, of the value n=3. Here, the advantage of the sample rate or replay speed of the reference sound signal, respectively, adapted to the variable replay speed of the test sound signal is advantageous, since Δt is also adapted to the replay speed, a more exact determination of the position of the film or offset in relation to the search window is possible compared to a fixed sample rate of the reference sound signal, since the only multiples of this sample rate are generated for a determination of the position in the film.

Thereby, for example, the time $T_0$ of the search window or reference sound signal, respectively, can be equal to $T_1$ of the previous correlation since the film is only played forward.

Figure 6A:
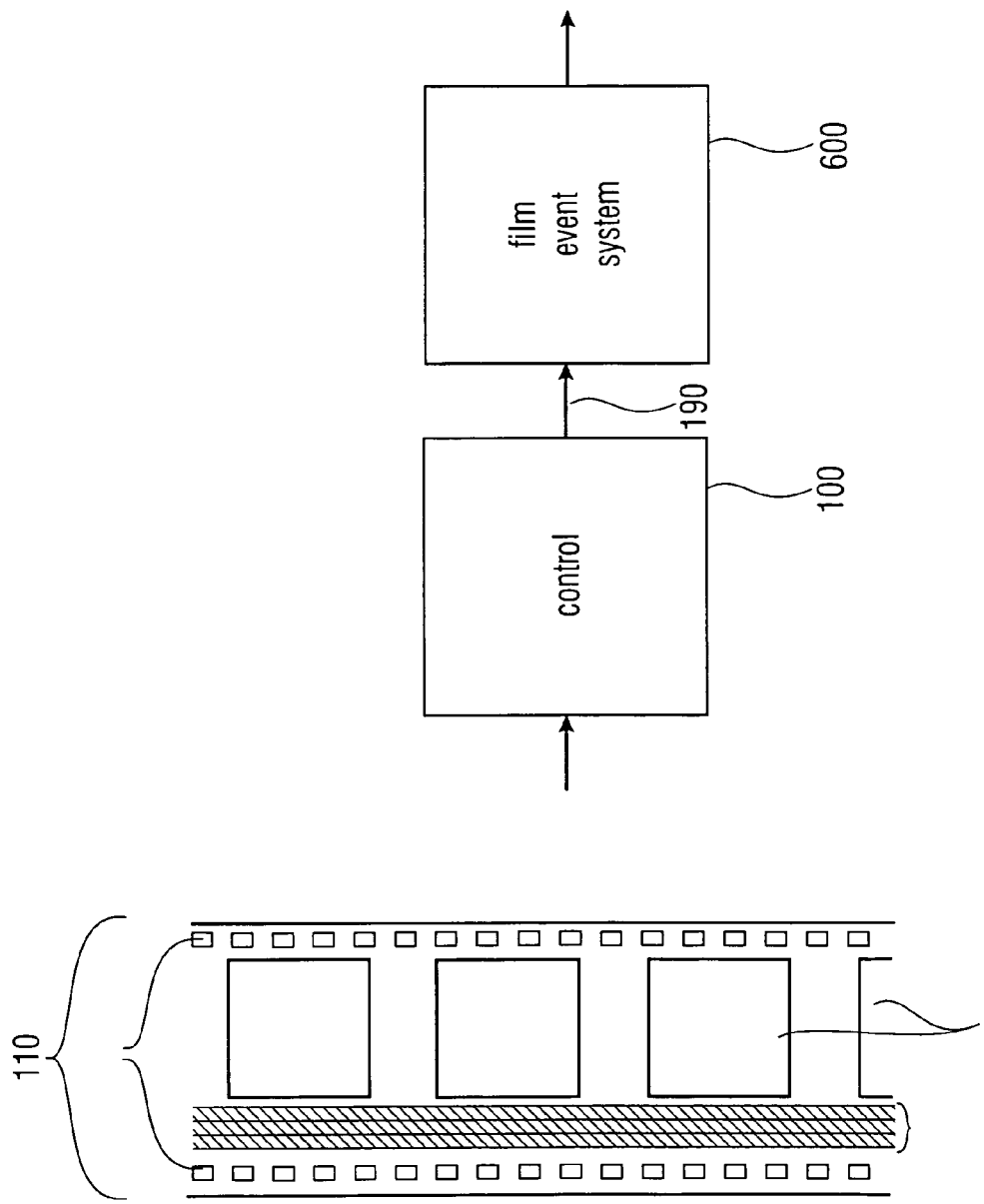
FIG. 6a is a basic block diagram of an exemplary film projection system with an apparatus for generating a control signal for a film event system and a film event system.

FIG. 6a shows an embodiment of a film system, wherein an apparatus 100 for generating a control signal 190 is coupled to a film event system 600, thereby, the apparatus 100 for generating a control signal based on the film 110, shown in FIG. 8, generates the control signal 190, for example a time code, with which the film event system 600 is synchronized.

Figure 6B:
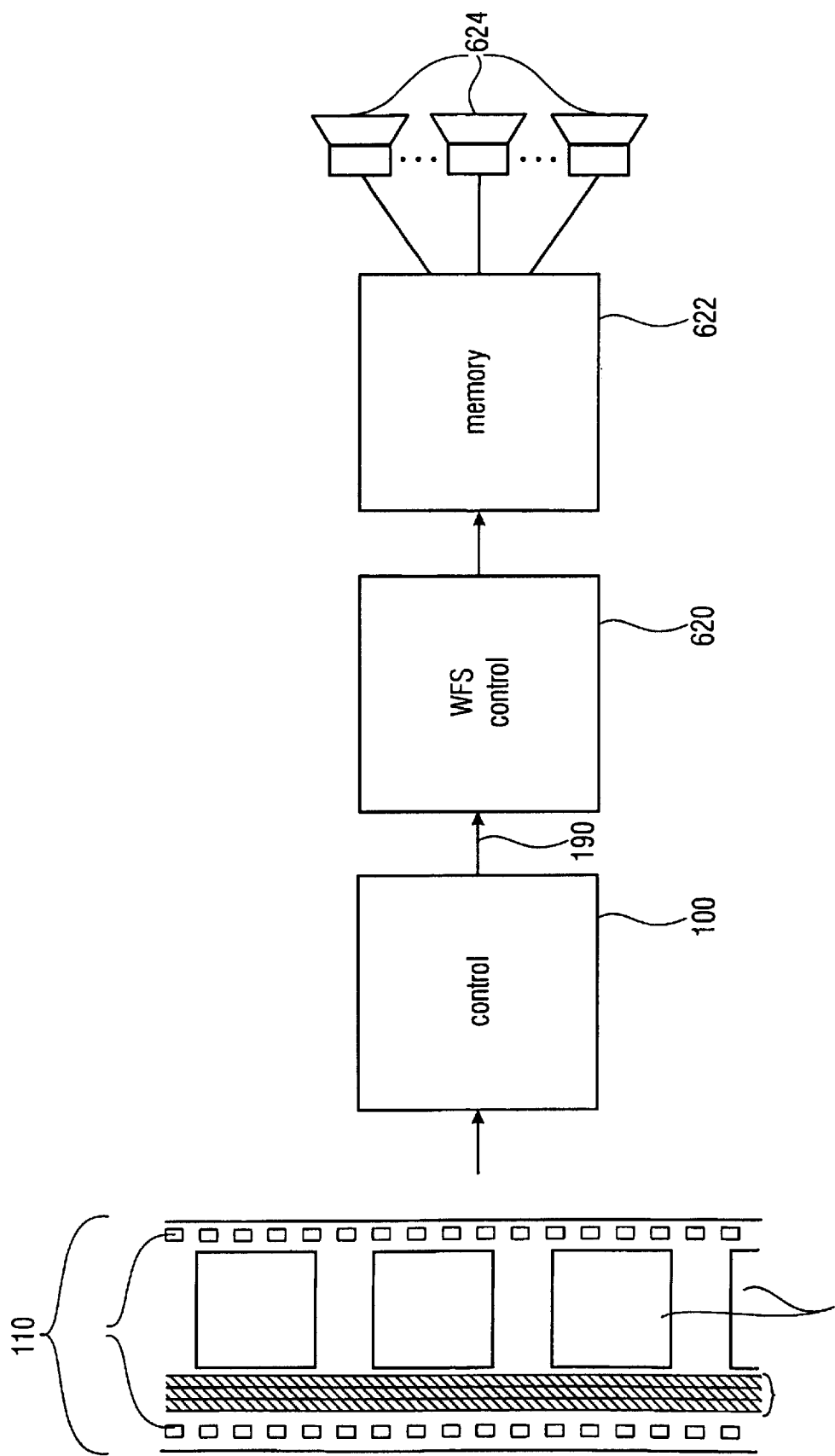
FIG. 6b is a basic block diagram of an exemplary film projection system with an apparatus for generating a control signal with an exemplary audio film event system.

FIG. 6b shows a film system having an apparatus 100 for generating a control signal 100 and a wave-field synthesis system 610 as exemplary film event system, wherein the embodiment of the wave-field synthesis system 610 comprises a means 620 for controlling the wave-field synthesis system, a digital memory 622 for the wave-field synthesis audio signal and a plurality of loudspeakers 624 for the wave-field synthesis system. Based on the film 110 or an analog film soundtrack 114, respectively, the means 100 for generating a control signal generates the control signal 190 to enable a wave-field synthesis audio experience with an originally analogously soundtracked film in a lip synchronous way.

As an alternative to the wave-field synthesis system 610, naturally, other audio systems, for example digital audio systems or digital surround audio systems can be synchronized via the apparatus 100 for generating a control signal in a lip synchronous way.

Figure 7:
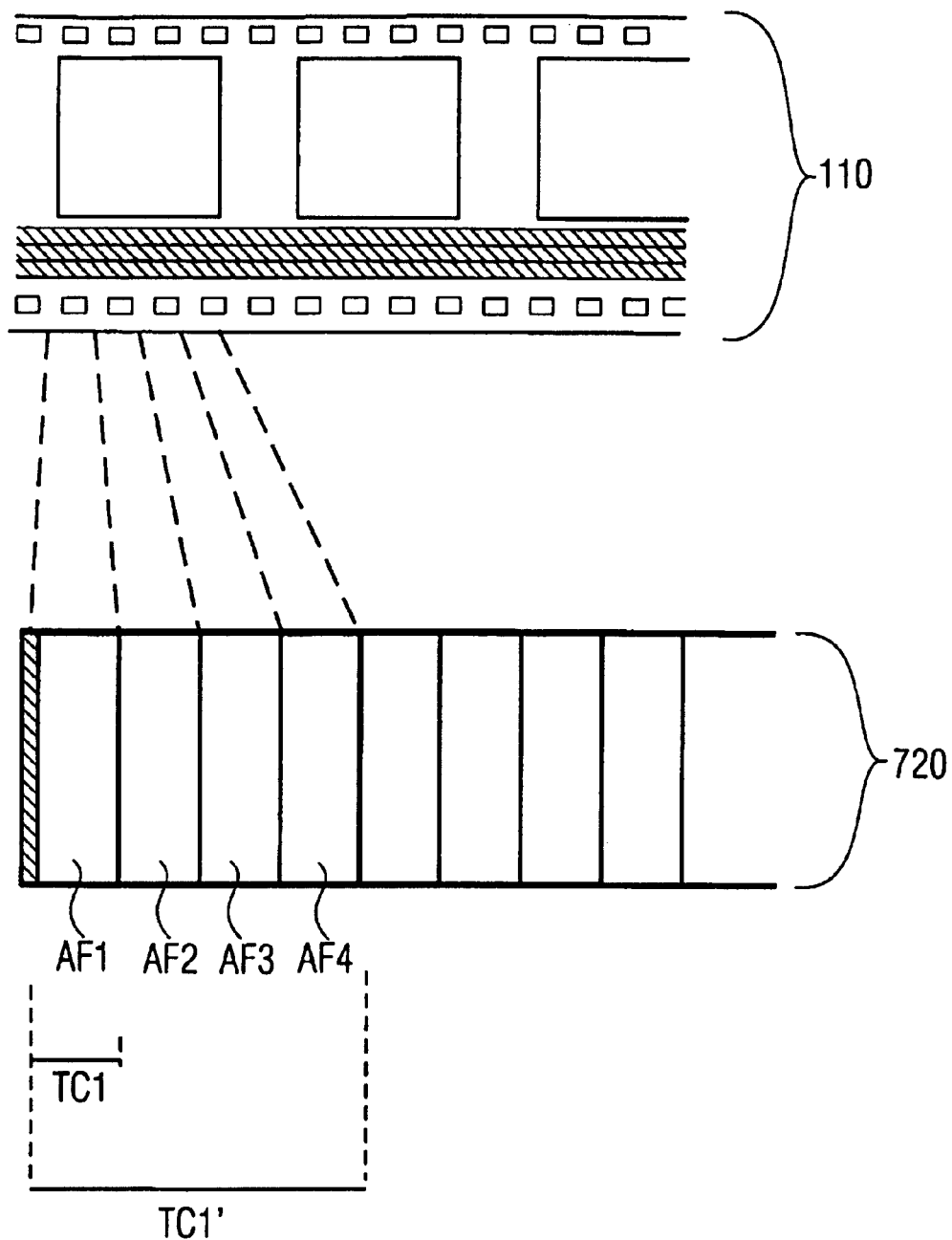
FIG. 7 is a schematic representation of an exemplary association of a time scale to a piece of film information.

FIG. 7 shows an exemplary film as illustrated in FIG. 8, an exemplary digitally stored reference sound signal 720 and an association of a time scale.

When generating the stored film information or the reference sound signal, respectively, the analog sound signal is sampled at a given replay speed and a given sample rate, for example 44.1 kHz and sound portions of, for example, 10 ms are stored as a so called audio frame, i.e. the digital reference sound signal is present as a sequence of audio frames on the memory. The associated time of a time scale can then, for example, consist in numbering the audio frames from 0 or 1 in an ascending way as time code or time scale, respectively, time code TC1 corresponds to audio frame AF1 in FIG. 1 or for example to find the starting time or end time of an audio frame as time code, such as for the first audio frame either 0 ms or 10 ms when an audio frame has a length of 10 ms.

Usually, time codes have formats like hour:minute:second:frame, wherein frame usually relates to video frames with, for example, 24 frames per second (cinema film).

Thus, the time scale or time code can associate several audio frames to one video frame or define an audio frame as smallest time scale unit.

Correspondingly, the time code or the time scale can, for example, associate four audio frames to one time code, see TC1' in FIG. 7, which comprises four audio frames AF1 to AF4, or associate a single audio frame to a time code, see TC1 in FIG. 7, to which one audio frame AF1 is associated. Thereby, depending on audio format, the audio frames can also represent portions of the audio signal overlapping in time.

The control signal 190 can, for example, be formed as time code, but also as a sequence of pulses, wherein, for example, every pulse corresponds to a time scale unit and the film event system accumulates the pulses similar to a relative time code to synchronize with the film.

A further embodiment offers the approach to embed a watermark into the audio and/or video signal to further have, for example, an analog sound signal as fallback, but to realize at the same time a time code for synchronous additional services. It is an advantage of this approach that even with "difficult" audio signals, e.g. very quiet sequences or even similar "monotonous" sounds, a clean clock recovery is possible. For this variation, basically, the full set of relevant watermarked claims is useful, particularly in the area of searching for the correct clock rate or the readjustment of the sample rate, respectively. The decisive disadvantage of this approach is, however, that the actual film is altered or a new version or the copy of the film has to be made, respectively, in order to be able to embed the watermarks into the audio and/or video signal.

Depending on the circumstances, the inventive method can be implemented in hardware or in software. The implementation can be made on a digital storage medium, particularly a disc or CD with electronically readable control signals, which can interact with a programmable computer system such that the method is performed. Generally, the invention consists also in a computer program product with a program code for performing the inventive method stored on a machine-readable carrier when the computer program product runs on a computer. Thus, in other words, the invention can be realized as a computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating a control signal for a film event system to synchronize film events with an image reproduction, wherein a film comprises film information applied in a time sequence, comprising:
   a storage for storing the film information, wherein a time scale is associated to the stored film information;
   a receiver for receiving a section read from the film;
   a comparator for comparing the read section with the stored film information; and
   a determiner for determining the control signal based on the comparison and the time scale.

2. The apparatus according to claim 1, wherein the comparator is formed to perform a correlation between a test sound signal replayable with variable speed and a reference sound signal, which is a digitally stored version of the test sound signal, the comparator comprising:
   a determiner for determining a measure for a test replay speed of the test sound signal;
   a variator for varying a test sample rate, by which the test sound signal is sampled, to generate a modified test sound signal in dependence on the measure for the replay speed or for varying a reference sample rate of the digitally stored reference sound signal for providing a modified reference sound signal in dependence on the measure for the replay speed, wherein the variator is formed to vary the test sample rate or the reference sample rate such that a deviation between a replay speed associated to the test sound signal or a reference replay speed associated to the modified reference sound signal is reduced, or a deviation between a replay speed associated to the modified test sound signal and a reference replay speed associated to the reference sound signal, or a deviation between a replay speed associated to the modified test sound signal and a reference replay speed associated to a modified reference sound signal is reduced; and a comparator for comparing the modified test sound signal and the reference sound signal or the test sound signal and the modified reference sound signal or the modified test sound signal and the modified reference sound signal to obtain a result of the correlation.

3. The apparatus according to claim 2, wherein the replay speed of the test sound signal and the reference replay speed are defined such that the test sound signal is determined by a soundtrack applied to the film, and the deviation between the replay speed associated to the test sound signal and the reference replay speed associated to the modified reference sound signal, or the deviation between the replay speed associated to the modified test sound signal and the reference replay speed associated to the reference sound signal, or the deviation between the replay speed associated to the modified test sound signal and the reference replay speed associated to the modified reference sound signal, is at a minimum when a test sound signal or modified test sound signal and a reference sound signal or a modified reference sound signal associate an equal time length or an equal number of samples equidistant in time to a soundtrack section of equal spatial length.

4. The apparatus according to claim 2, wherein the comparator is formed to represent the test sound signal by a sequence of samples and to represent the reference sound signal by a sequence of reference samples to correlate the sequence of test samples with the sequence of reference samples, wherein the correlation result is based on the sequence of the test samples being offset by at least one sample in relation to the sequence of reference samples, and for every offset the corresponding correlation value is determined by summation of products of a pairwise multiplication of samples of the sequence of test samples and of samples of the sequence of reference samples or their amounts, so that the result of the correlation is a sequence of correlation values, so that the result of the correlation has a maximum for the time offset value, wherein the sequence of test samples maximally matches the sequence of reference samples.

5. The apparatus according to claim 2, wherein the comparator is formed to compare a plurality of reference sound signals with the same test sound signal, respectively, to obtain a plurality of comparison results, wherein the plurality of reference sound signals is based on a plurality of different reference sample rates, and wherein a reference sound signal of the plurality of reference sound signals is the reference sound signal or modified reference sound signal.

6. The apparatus according to claim 5, comprising:
a quality-evaluator for quality evaluation of the plurality of correlation results to determine a similar reference sound signal from the plurality of reference sound signals based on one or a plurality of criteria.

7. The apparatus according to claim 6, wherein the quality-evaluator is formed to determine a peak noise distance for every correlation result and to define a reference sound signal as the most similar reference sound signal when it has the highest peak noise distance compared to the other reference sound signals.

8. The apparatus according to claim 6, wherein the comparator is formed to compare a first reference sound signal based on a first reference sample rate with the test sound signal to obtain a first correlation result to compare a second reference sound signal based on a second reference sample rate with the test sound signal to obtain a second correlation result and to compare a third reference sound signal based on a third reference sample rate with the test sound signal to obtain a third correlation result, wherein the second reference sample rate is higher than the first reference sample rate and the third reference sample rate is higher than the second reference sample rate, and wherein the quality-evaluator determines a most similar reference sound signal based on the correlation results, further having a variator, which is formed to not alter the first, second and third reference sample rate for a next correlation when the second reference test signal is the most similar reference test signal, to increase the first, second, third sample rate when the third reference sound signal is the most similar reference sound signal, and to reduce the first, second and third reference sample rate when the first reference sound signal is the most similar reference sound signal.

9. The apparatus according to claim 2, wherein the comparator is formed to compare the plurality of reference sound signals to the test sound signal in parallel.

10. The apparatus according to claim 1, wherein the determiner for determining the control signal is formed to determine a position in the film, the determiner for determining the control signal comprising:
a memory for storing a reference fingerprint representation of the film information, wherein the fingerprint representation is formed such that a time curve of the fingerprint representation depends on a time curve of the film information, and wherein a time scale is associated to a stored reference fingerprint representation;
a receiver for receiving a section read from the film;
an extractor for extracting a test fingerprint representation from the read-in section; and
a comparator for comparing the test fingerprint representation with the reference fingerprint representation to determine the position in the film based on the comparison and the time scale.

11. The apparatus according to claim 10, wherein the film information is applied to an analog soundtrack on the film, and wherein the receiver is formed to receive the analog sound information from the analog soundtrack.

12. The apparatus according to claim 10, wherein the extractor is formed to calculate a representation with a spectral flatness as fingerprint representation, so that a time curve of the fingerprint representation comprises a time curve of the spectral flatness.

13. The apparatus according to claim 1, wherein the determiner for determining the control signal is formed to determine a position in a film, the determiner for determining the control signal comprising:
a memory for storing film information applied to the film in time sequence, wherein a time scale is associated to the stored film information;
a receiver for receiving a section read from the film;
a synchronizer formed to compare a sequence of samples of the read section based on a first sample rate and a first search window of the stored film information to obtain a coarse result, and to compare a sequence of samples of the read portion based on a second sample and a second search window of the stored film information to obtain a fine result pointing to the position of the film, wherein a position of the second search window in the stored film information depends on the coarse result, wherein the first search window is longer in time than the second search window and wherein the first sample rate is lower than the second sample rate.

14. The apparatus according to claim 13, wherein the synchronizer is formed to compare a sequence of samples of a read section via correlation with a search window of the stored film information.

15. The apparatus according to claim 13, wherein the synchronizer is formed to compare the sequence of samples of the read section based on a first sample rate with a plurality of versions of the first search window each based on a different sample rate and wherein the position of the second search window depends on a version of the first search window for which a deviation between a replay speed associated to the sequence of samples of the read section and a search window replay speed associated to a version of the first search window is minimum.

16. The apparatus according to claim 15, wherein the synchronizer is formed to determine the position of the second search window based on a first search window, whose correlation result determined via a correlation has a higher peak noise distance compared to one or a plurality of correlation results of one or a plurality of other first search windows.

17. The apparatus according to claim 1, further having a further apparatus for receiving a section read from the film, wherein the section differs from the section received by the apparatus for receiving.

18. The apparatus according to claim 1, wherein the storage is formed to store a downmix, and wherein the receiver is formed to receive a plurality of test signals from a plurality of soundtracks and to generate a downmix.

19. The apparatus according to claim 1, wherein the storage is formed to store additionally at least another type of film information,
having at least one additional receiver, wherein the one additional receiver is formed to read a section of a different type of film information from the film than the receiver,
wherein the comparator is formed to compare the received sections of at least two different types of film information with the corresponding types of stored film information, and
wherein the determiner is formed to determine the control signal from the at least two comparison results based on the at least two different types of film information, via averaging, plurality decision or prioritization.

20. A method of generating a control signal for a film event system to synchronize film events with an image reproduction, wherein a film comprises film information applied in a time sequence, comprising the steps of:
receiving a section read from the film;
comparing the read section with stored film information, wherein a time scale is associated to the stored film information; and
determining the control signal based on the comparison and the time scale.

21. A non-transitory computer-readable medium having stored thereon a computer program for performing a method of generating a control signal for a film event system to synchronize film events with an image reproduction, wherein a film comprises film information applied in a time sequence, comprising the steps of:
receiving a section read from the film;
comparing the read section with stored film information, wherein a time scale is associated to the stored film information; and
determining the control signal based on the comparison and the time scale,
when the computer program runs on a computer.

22. An apparatus for determining a position in a film, comprising:
a memory for storing film information applied to a film in time sequence, wherein a time scale is associated with the stored film information;
a receiver for receiving and sampling a section read from the film;
a synchronizer formed to compare a sequence of samples of the read section based on a first sample rate and a first search window of the stored film information with respect to matching, in order to obtain a coarse result, and to compare a sequence of samples of the read section based on a second sample rate and a second search window of the stored film information with respect to matching, in order to obtain a fine result pointing to the position of the film, wherein a position of the second search window in the stored film information depends on the coarse result, wherein a search window is defined by a first time ($T_0$) and a second time ($T_3$) on the timescale, wherein the first search window is longer in time than the second search window, and wherein the first sample rate is lower than the second sample rate.

23. A method for determining a position in a film, comprising:
receiving and sampling a section read from the film; and
comparing a sequence of samples of the read section based on a first sample rate and a first search window of the stored film information with respect to matching, in order to obtain a coarse result, wherein the film information is applied to a film in time sequence, and a time scale is associated with the stored film information; and
comparing a sequence of samples of the read section based on a second sample rate and a second search window of the stored film information with respect to matching, in order to obtain a fine result pointing to the position of the film, wherein a position of the second search window in the stored film information depends on the coarse result, wherein a search window is defined by a first time ($T_0$) and a second time ($T_3$) on the timescale, wherein the first search window is longer in time than the second search window, and wherein the first sample rate is lower than the second sample rate.

24. An apparatus for determining a position in a film with advance perforations, images and sound information applied in a time sequence, the sound information being applied on an analog or digital sound track on the film, comprising:
a memory for storing a reference fingerprint representation of the sound information, wherein the reference fingerprint representation is a fingerprint representation of the sound information, wherein the reference fingerprint representation is generated based on methods of the feature extraction and is formed so that a time curve of the fingerprint representation depends on a time curve of the sound information, wherein a time scale is associated with a stored reference fingerprint representation, and wherein the time scale is stored together with the reference fingerprint representation;
a receiver for receiving a portion of the sound information from the analog or digital sound track, which portion is read from the film;
an extractor for extracting a test fingerprint representation from the read portion;
a comparator for comparing the test fingerprint representation with the reference fingerprint representation and for determining the position in the film on the basis of the comparison and the stored time scale, wherein the position in the film corresponds to a time of the time scale.

25. A method for determining a position in a film with advance perforations, images and sound information applied in a time sequence, the sound information being applied on an analog or digital sound track on the film, comprising:

receiving a portion of the sound information from the analog or digital sound track, which portion is read from the film;

extracting a test fingerprint representation from the read portion; and comparing the test fingerprint representation with a stored reference fingerprint representation, wherein the reference fingerprint representation is a fingerprint representation of the sound information, wherein the fingerprint representation is generated based on methods of the feature extraction and is formed so that a time curve of the fingerprint representation depends on a time curve of the sound information, wherein a time scale is associated with the stored reference fingerprint representation, and wherein the time scale is stored together with the reference fingerprint representation; and determining the position in the film on the basis of the comparison and the stored time scale, wherein the position in the film corresponds to a time of the time scale.

* * * * *